(12) United States Patent
Kashiwagi et al.

(10) Patent No.: US 11,795,316 B2
(45) Date of Patent: Oct. 24, 2023

(54) PRESSURE-RESPONSIVE PARTICLES, CARTRIDGE, APPARATUS FOR MANUFACTURING PRINTED MATTER, METHOD FOR MANUFACTURING PRINTED MATTER, PRINTED MATTER, SHEET FOR MANUFACTURING PRINTED MATTER, AND METHOD FOR MANUFACTURING SHEET FOR MANUFACTURING PRINTED MATTER

(71) Applicant: FUJIFILM Business Innovation Corp., Tokyo (JP)

(72) Inventors: Satomi Kashiwagi, Kanagawa (JP);
Satoshi Inoue, Kanagawa (JP);
Sumiaki Yamasaki, Kanagawa (JP);
Yoshifumi Iida, Kanagawa (JP);
Takako Kobayashi, Kanagawa (JP);
Takashi Hasegawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 218 days.

(21) Appl. No.: 17/161,702

(22) Filed: Jan. 29, 2021

(65) Prior Publication Data
US 2022/0064425 A1 Mar. 3, 2022

(30) Foreign Application Priority Data
Sep. 2, 2020 (JP) ................................ 2020-147778

(51) Int. Cl.
| | | |
|---|---|---|
| *C08L 25/14* | (2006.01) |
| *C08K 3/22* | (2006.01) |
| *C08K 3/36* | (2006.01) |
| *B41M 5/52* | (2006.01) |
| *B41J 13/00* | (2006.01) |
| *C09J 125/14* | (2006.01) |
| *C09J 7/38* | (2018.01) |

(52) U.S. Cl.
CPC ............... *C08L 25/14* (2013.01); *B41J 13/00* (2013.01); *B41M 5/5218* (2013.01); *B41M 5/5254* (2013.01); *C08K 3/22* (2013.01); *C08K 3/36* (2013.01); *C09J 7/385* (2018.01); *C09J 125/14* (2013.01); *C08K 2003/2241* (2013.01)

(58) Field of Classification Search
None
See application file for complete search history.

(56) References Cited

U.S. PATENT DOCUMENTS

| | | | | |
|---|---|---|---|---|
| 5,250,382 A | * | 10/1993 | Shimojo | ............ G03G 9/08797 430/109.3 |
| 2009/0226834 A1 | * | 9/2009 | Matsumura | .......... G03G 9/0804 430/124.23 |
| 2013/0030110 A1 | | 1/2013 | Okada et al. | |

FOREIGN PATENT DOCUMENTS

| | | |
|---|---|---|
| EP | 3147339 | 4/2020 |
| JP | 2007045861 | 2/2007 |
| JP | 2007229993 | 9/2007 |
| JP | 2008073971 | 4/2008 |
| JP | 2012188512 | 10/2012 |
| JP | 2018002889 | 1/2018 |
| JP | 2018163198 | 10/2018 |
| JP | 6468727 | 2/2019 |

* cited by examiner

*Primary Examiner* — Robert T Butcher
(74) *Attorney, Agent, or Firm* — JCIPRNET

(57) ABSTRACT

Pressure-responsive particles include pressure-responsive base particles and inorganic oxide particles, in which the pressure-responsive base particles contain a styrene-based resin which contains styrene and other vinyl monomers as polymerization components and a (meth)acrylic acid ester-based resin which contains at least two kinds of (meth)acrylic acid esters as polymerization components and in which amass ratio of the (meth)acrylic acid esters to all polymerization components is 90% by mass or higher, a liberation rate of the inorganic oxide particles is 10% by mass or higher and 40% by mass or lower, the pressure-responsive particles have at least two glass transition temperatures, and a difference between a lowest glass transition temperature and a highest glass transition temperature is 30° C. or higher.

26 Claims, 4 Drawing Sheets

PRESSURE-RESPONSIVE PARTICLES, CARTRIDGE, APPARATUS FOR MANUFACTURING PRINTED MATTER, METHOD FOR MANUFACTURING PRINTED MATTER, PRINTED MATTER, SHEET FOR MANUFACTURING PRINTED MATTER, AND METHOD FOR MANUFACTURING SHEET FOR MANUFACTURING PRINTED MATTER

CROSS-REFERENCE TO RELATED APPLICATIONS

This application is based on and claims priority under 35 USC 119 from Japanese Patent Application No. 2020-147778 filed Sep. 2, 2020.

BACKGROUND

(i) Technical Field

The present invention relates to pressure-responsive particles, a cartridge, an apparatus for manufacturing a printed matter, a method for manufacturing a printed matter, a printed matter, a sheet for manufacturing a printed matter, and a method for manufacturing a sheet for manufacturing a printed matter.

(ii) Related Art

JP2012-188512A describes an aqueous dispersion-type pressure-sensitive adhesive composition containing two kinds of acrylic polymers in an aqueous solvent.

JP2018-002889A describes an adhesive material that satisfies Formula "20° C.≤T (1 MPa)−T (10 MPa)" (T (1 MPa) represents a temperature at which the material has a viscosity of $10^4$ Pa·s under a pressure of 1 MPa applied thereto, and T (10 MPa) represents a temperature at which the material has a viscosity of $10^4$ Pa·s under a pressure of 10 MPa applied thereto).

JP2018-163198A describes a pressure fix toner containing a styrene resin and a (meth)acrylic acid ester resin having a glass transition temperature lower than a glass transition temperature of the styrene resin by 30° C. or more. The toner has a sea-island structure configured with a sea portion containing the styrene resin and island portions containing the (meth)acrylic acid ester resin, and includes a core portion where a long diameter of the island portion is 200 nm or greater and 500 nm or less and a shell layer which coats the core portion and contains a resin having a glass transition temperature of 50° C. or higher.

JP6468727B describes an aqueous dispersion-type pressure-sensitive adhesive composition containing an acrylic polymer (A) obtained by polymerizing a monomer raw material (A) and an acrylic polymer (B) obtained by polymerizing a monomer raw material (B). The acrylic polymer (B) has a glass transition temperature of 0° C. or higher and has a weight average molecular weight higher than $0.3 \times 10^4$ and $5 \times 10^4$ or lower. The acrylic polymer (A) has a weight average molecular weight of $40 \times 10^4$ or higher. The difference between the glass transition temperature of the acrylic polymer (B) and the glass transition temperature of the acrylic polymer (A) is 70° C. or higher. The proportion of a carboxyl group-containing monomer contained in the monomer raw material (B) is 3% by weight or higher and 20% by weight or lower.

JP2007-229993A describes crimped postcard paper including an adhesive layer containing an acrylic acid/alkyl methacrylate copolymer.

JP2007-045861A describes an adhesive for crimped postcards containing a hydrocarbon-based resin as a main component.

JP2008-073971A describes a powder adhesive that is electrostatically transferred to paper by an electrophotographic method.

SUMMARY

Aspects of non-limiting embodiments of the present disclosure relate to pressure-responsive particles which contain a styrene-based resin and a (meth)acrylic acid ester-based resin, have higher adhesiveness that enables surfaces of a recording medium to peelably adhere to each other compared to pressure-responsive particles containing a homopolymer of a (meth)acrylic acid ester as a (meth)acrylic acid ester-based resin, and further prevent the loss of an image on an adhesive surface in a case where the adhesive surface is peeled compared to pressure-responsive particles in which a liberation rate of inorganic oxide particles is lower than 10% by mass.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Specific modes for achieving the above object include the following aspects.

According to an aspect of the present disclosure, there are provided pressure-responsive particles including pressure-responsive base particles and inorganic oxide particles, in which the pressure-responsive base particles contain a styrene-based resin which contains styrene and other vinyl monomers as polymerization components and a (meth)acrylic acid ester-based resin which contains at least two kinds of (meth)acrylic acid esters as polymerization components and in which a mass ratio of the (meth)acrylic acid esters to all polymerization components is 90% by mass or higher, a liberation rate of the inorganic oxide particles is 10% by mass or higher and 40% by mass or lower, the pressure-responsive particles have at least two glass transition temperatures, and a difference between a lowest glass transition temperature and a highest glass transition temperature is 30° C. or higher.

BRIEF DESCRIPTION OF THE DRAWINGS

Exemplary embodiment(s) of the present invention will be described in detail based on the following figures, wherein.

DETAILED DESCRIPTION

Figure 1:
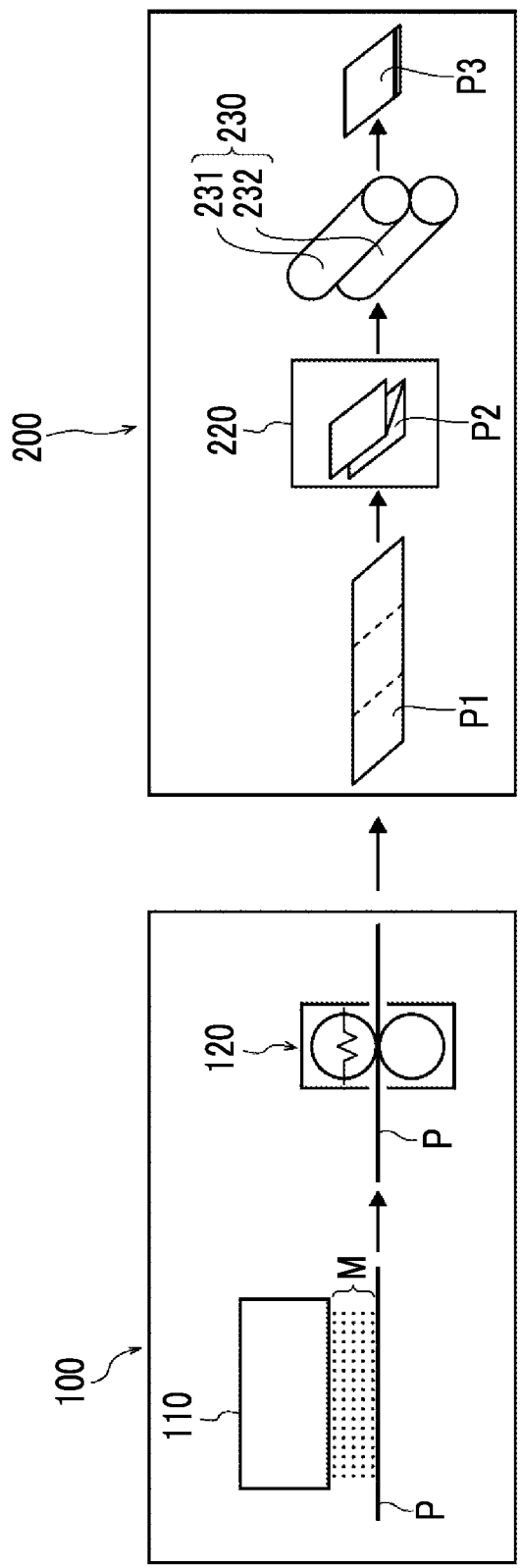
FIG. 1 is a schematic view showing an example of an apparatus for manufacturing a printed matter according to the present exemplary embodiment.

The exemplary embodiments of the present disclosure will be described below. The following descriptions and examples merely illustrate the exemplary embodiments, and do not limit the scope of the exemplary embodiments.

In the present disclosure, a range of numerical values described using "to" represents a range including the numerical values listed before and after "to" as the minimum value and the maximum value respectively.

Regarding the ranges of numerical values described in stages in the present disclosure, the upper limit or lower limit of a range of numerical values may be replaced with the upper limit or lower limit of another range of numerical values described in stages. Furthermore, in the present disclosure, the upper limit or lower limit of a range of numerical values may be replaced with values described in examples.

In the present disclosure, the term "step" includes not only an independent step but a step which is not clearly distinguished from other steps as long as the intended goal of the step is achieved.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

Each component in the present disclosure may include a plurality of substances corresponding to each component. In a case where the amount of each component in a composition is mentioned in the present disclosure, and there are two or more kinds of substances corresponding to each component in the composition, unless otherwise specified, the amount of each component means the total amount of two or more kinds of the substances present in the composition.

In the present disclosure, two or more kinds of particles may correspond to each component. In a case where there are two or more kinds of particles corresponding to each component in a composition, unless otherwise specified, the particle diameter of each component means a value for a mixture of two or more kinds of the particles present in the composition.

In the present disclosure, the description "(meth)acryl" means that either "acryl" or "methacryl" may be used.

In the present disclosure, a printed matter formed by folding a recording medium and causing the facing surfaces to adhere to each other or a printed matter formed by stacking two or more recording media and causing the facing surfaces adhere to each other refers to "crimped printed matter".

Pressure-Responsive Particles

The pressure-responsive particles according to the present exemplary embodiment include pressure-responsive base particles and inorganic oxide particles, in which the pressure-responsive base particles contain a styrene-based resin which contains styrene and other vinyl monomers as polymerization components and a (meth)acrylic acid ester-based resin which contains at least two kinds of (meth)acrylic acid esters as polymerization components and in which a mass ratio of the (meth)acrylic acid esters to all polymerization components is 90% by mass or higher, a liberation rate of the inorganic oxide particles is 10% by mass or higher and 40% by mass or lower, the pressure-responsive particles have at least two glass transition temperatures, and a difference between the lowest glass transition temperature and the highest glass transition temperature is 30° C. or higher.

The pressure-responsive particles according to the present exemplary embodiment is pressure-responsive particles that are softened by pressure and allows surfaces of a recording medium to peelably adhere to each other.

The pressure-responsive particles according to the present exemplary embodiment have at least two glass transition temperatures, in which a difference between the lowest glass transition temperature and the highest glass transition temperature is 30° C. or higher. Due to these thermal characteristics, the pressure-responsive particles undergo phase transition by pressure. In the present disclosure, the pressure-responsive particles that undergo phase transition by pressure mean pressure-responsive particles satisfying the following Formula 1.

$$10° C. \leq T1-T2 \quad \text{Formula 1}$$

In Formula 1, T1 is a temperature at which the pressure-responsive particles have a viscosity of 10,000 Pa·s under a pressure of 1 MPa, and T2 is a temperature at which the pressure-responsive particles have a viscosity of 10,000 Pa·s under a pressure of 10 MPa. How to determine the temperature T1 and the temperature T2 will be described later.

The pressure-responsive particles according to the present exemplary embodiment contain "a styrene-based resin which contains styrene and other vinyl monomers as polymerization components" and "a (meth)acrylic acid ester-based resin which contains at least two kinds of (meth)acrylic acid esters as polymerization components and in which a mass ratio of the (meth)acrylic acid esters to all polymerization components is 90% by mass or higher". Therefore, the pressure-responsive particles readily undergo phase transition by pressure and have excellent adhesiveness. The mechanism is assumed to be as below.

Presumably, because a styrene-based resin and a (meth)acrylic acid ester-based resin are poorly compatible with each other in general, these resins may be contained in the pressure-responsive base particles in a phase-separated state. Furthermore, presumably, in a case where the pressure-responsive base particles are pressed, the (meth)acrylic acid ester-based resin having a relatively low glass transition temperature may undergo fluidization first, the fluidization may affect the styrene-based resin, and thus both of the resins may be fluidized. After being fluidized by pressure, the (meth)acrylic acid ester-based resin and the styrene-based resin in the pressure-responsive base particles are solidified as the pressure decreases and forma resin layer. Presumably, at this time, due to the poor compatibility, the resins may undergo phase separation again.

In the (meth)acrylic acid ester-based resin containing at least two kinds of (meth)acrylic acid esters as polymerization components, at least two kinds of ester groups are bonded to the main chain of the (meth)acrylic acid ester-based resin. Presumably, therefore, compared to a homopolymer of a (meth)acrylic acid ester, the (meth)acrylic acid ester-based resin may have a lower degree of molecular alignment in a solid state, and thus more readily fluidized by the application of pressure. In addition, in a case where the mass ratio of the (meth)acrylic acid esters to all polymerization components is 90% by mass or higher, at least two kinds of ester groups are present at high density. Presumably, therefore, the degree of molecular alignment of the (meth) acrylic acid ester-based resin in a solid state may be further reduced, and thus the resin may be readily fluidized by the application of pressure. Therefore, presumably, the pressure-responsive particles according to the present exemplary embodiment may be more readily fluidized by pressure, that is, more readily undergo phase transition by pressure, compared to pressure-responsive particles containing a homopolymer of a (meth)acrylic acid ester as a (meth)acrylic acid ester-based resin.

The (meth)acrylic acid ester-based resin, which contain at least two kinds of (meth)acrylic acid esters as polymerization components and in which the mass ratio of the (meth) acrylic acid esters to all polymerization components is 90% by mass or higher, has a low degree of molecular alignment even in a case where the resin is solidified again. Presumably, therefore, the phase separation of the (meth)acrylic acid ester-based resin and the styrene-based resin may be microscale phase separation. Presumably, the smaller the scale of phase separation of the styrene-based resin and the (meth)acrylic acid ester-based resin is, the higher the uniformity of an adhesive surface may be for an adherend, and the higher the adhesiveness may be. Presumably, therefore, the pressure-responsive particles according to the present exemplary embodiment may have higher adhesiveness compared to pressure-responsive particles containing a homopolymer of a (meth)acrylic acid ester as a (meth)acrylic acid ester-based resin.

The pressure-responsive particles according to the present exemplary embodiment include inorganic oxide particles as an external additive, and a liberation rate of the inorganic oxide particles is 10% by mass or higher and 40% by mass or lower. Therefore, the pressure-responsive particles hardly cause the loss of an image on an adhesive surface in a case where the adhesive surface is peeled.

In a case where the liberation rate of the inorganic oxide particles is lower than 10% by mass, the pressure-responsive base particles tend to be aggregated. In a case where the aggregated base particles are applied to an adhesive surface, the adhesive force increases in some parts of the adhesive surface, and sometimes the image in such parts is lost during peeling.

In contrast, in a case where the liberation rate of the inorganic oxide particles is higher than 40% by mass, the liberated inorganic oxide particles are aggregated. In a case where the aggregated inorganic oxide particles are applied to an adhesive surface, the adhesive force decreases in some parts of the adhesive surface. As a result, sometimes the overall adhesive force of the adhesive surface tends to decrease.

Hereinafter, the components, structure, and characteristics of the pressure-responsive particles according to the present exemplary embodiment will be specifically described. In the following description, unless otherwise specified, "styrene-based resin" means "styrene-based resin containing styrene and other vinyl monomers as polymerization components", and "(meth)acrylic acid ester-based resin" means "(meth) acrylic acid ester-based resin which contains at least two kinds of (meth)acrylic acid esters as polymerization components and in which the mass ratio of the (meth)acrylic acid esters to all polymerization components is 90% by mass or higher".

Pressure-Responsive Base Particles

The pressure-responsive base particles contain at least a styrene-based resin or a (meth)acrylic acid ester-based resin. The pressure-responsive base particles may contain a colorant, a release agent, and other additives.

From the viewpoint of maintaining adhesiveness, in the pressure-responsive base particles, for example, the content of the styrene-based resin is preferably higher than the content of the (meth)acrylic acid ester-based resin. The content of the styrene-based resin with respect to the total content of the styrene-based resin and the (meth)acrylic acid ester-based resin is, for example, preferably 55% by mass or higher and 80% by mass or lower, more preferably 60% by mass or higher and 75% by mass or lower, and even more preferably 65% by mass or higher and 70% by mass or lower.

Styrene-Based Resin

The pressure-responsive base particles configuring the pressure-responsive particles according to the present exemplary embodiment contain a styrene-based resin containing styrene and other vinyl monomers as polymerization components.

From the viewpoint of inhibiting the pressure-responsive particles from being fluidized in a state where no pressure is applied, the mass ratio of styrene to all polymerization components of the styrene-based resin is, for example, preferably 60% by mass or higher, more preferably 70% by mass or higher, and even more preferably 75% by mass or higher. From the viewpoint of forming pressure-responsive particles that readily undergo phase transition by pressure, the mass ratio of styrene to all polymerization components of the styrene-based resin is, for example, preferably 95% by mass or lower, more preferably 90% by mass or lower, and even more preferably 85% by mass or lower.

Examples of vinyl monomers other than styrene configuring the styrene-based resin include a styrene-based monomer other than styrene and an acrylic monomer.

Examples of the styrene-based monomer other than styrene include vinylnaphthalene; alkyl-substituted styrene such as α-methylstyrene, o-methylstyrene, m-methylstyrene, p-methylstyrene, p-ethylstyrene, 2,4-dimethylstyrene, p-n-butyl styrene, p-tert-butyl styrene, pn-hexyl styrene, p-n-octyl styrene, p-n-nonyl styrene, p-n-decyl styrene, and p-n-dodecyl styrene; aryl-substituted styrene such as p-phenylstyrene; alkoxy-substituted styrene such as p-methoxystyrene; halogen-substituted styrene such as p-chlorostyrene, 3,4-dichlorostyrene, p-fluorostyrene, and 2,5-difluorostyrene; nitro-substituted styrene such as m-nitrostyrene, o-nitrostyrene, and p-nitrostyrene; and the like. One kind of styrene-based monomer may be used singly, or two or more kinds of styrene-based monomers may be used in combination.

As the acrylic monomer, for example, at least one kind of acrylic monomer selected from the group consisting of a (meth)acrylic acid and a (meth)acrylic acid ester is preferable. Examples of the (meth)acrylic acid ester include a (meth)acrylic acid alkyl ester, a (meth)acrylic acid carboxy-substituted alkyl ester, a (meth)acrylic acid hydroxy-substituted alkyl ester, a (meth)acrylic acid alkoxy-substituted alkyl ester, a di(meth)acrylic acid ester, and the like. One kind of acrylic monomer may be used singly, or two or more kinds of acrylic monomers may be used in combination.

Examples of the (meth)acrylic acid alkyl ester include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth) acrylate, cyclohexyl (meth)acrylate, dicyclohexyl (meth) acrylate, dicyclopentanyl (meth)acrylate, isobornyl (meth) acrylate, and the like.

Examples of the (meth)acrylic acid carboxy-substituted alkyl ester include 2-carboxyethyl (meth)acrylate and the like.

Examples of the (meth)acrylic acid hydroxy-substituted alkyl ester include 2-hydroxyethyl (meth)acrylate, 2-hydroxypropyl (meth)acrylate, 3-hydroxypropyl (meth)acrylate, and 2-hydroxybutyl (meth)acrylate, 3-hydroxybutyl (meth)acrylate, 4-hydroxybutyl (meth)acrylate, and the like.

Examples of the (meth)acrylic acid alkoxy-substituted alkyl ester include 2-methoxyethyl (meth)acrylate and the like.

Examples of the di(meth)acrylic acid ester include ethylene glycol di(meth)acrylate, diethylene glycol di(meth)acrylate, triethylene glycol di(meth)acrylate, butanediol di(meth)acrylate, pentandiol di(meth)acrylate, hexanediol di(meth)acrylate, nonanediol di(meth)acrylate, decanediol di(meth)acrylate, and the like.

Examples of the (meth)acrylic acid ester include 2-(diethylamino)ethyl (meth)acrylate, benzyl (meth)acrylate, methoxypolyethylene glycol (meth)acrylate, and the like.

In addition to the styrene-based monomer and the acrylic monomer, examples of other vinyl monomers configuring the styrene-based resin also include (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene.

From the viewpoint of forming pressure-responsive particles that readily undergo phase transition by pressure, for example, the styrene-based resin preferably contains, as a polymerization component, a (meth)acrylic acid ester, more preferably contains (meth)acrylic acid alkyl ester, even more preferably contains a (meth)acrylic acid alkyl ester having an alkyl group with 2 to 10 carbon atoms, still more preferably contains a (meth)acrylic acid alkyl ester having an alkyl group with 4 to 8 carbon atoms, and particularly preferably contains at least one of n-butyl acrylate or 2-ethylhexyl acrylate. From the viewpoint of forming pressure-responsive particles that readily undergo phase transition by pressure, for example, it is preferable that the styrene-based resin and the (meth)acrylic acid ester-based resin contain the same kind of (meth)acrylic acid ester as a polymerization component.

From the viewpoint of inhibiting the pressure-responsive particles from being fluidized in a state where no pressure is applied, the mass ratio of a (meth)acrylic acid ester to all polymerization components of the styrene-based resin is, for example, preferably 40% by mass or lower, more preferably 30% by mass or lower, and even more preferably 25% by mass or lower. From the viewpoint of forming pressure-responsive particles that readily undergo phase transition by pressure, the mass ratio of a (meth)acrylic acid ester to all polymerization components of the styrene-based resin is, for example, preferably 5% by mass or higher, more preferably 10% by mass or higher, and even more preferably 15% by mass or higher. As the (meth)acrylic acid ester mentioned herein, for example, a (meth)acrylic acid alkyl ester is preferable, a (meth)acrylic acid alkyl ester having an alkyl group with 2 to 10 carbon atoms is more preferable, and a (meth)acrylic acid alkyl ester having an alkyl group with 4 to 8 carbon atoms is even more preferable.

For example, it is particularly preferable that the styrene-based resin contain at least one of n-butyl acrylate or 2-ethylhexyl acrylate as a polymerization component. From the viewpoint of inhibiting the pressure-responsive particles from being fluidized in a state where no pressure is applied, the total amount of n-butyl acrylate and 2-ethylhexyl acrylate with respect to the total amount of polymerization components of the styrene-based resin is, for example, preferably 40% by mass or less, more preferably 30% by mass or less, and even more preferably 25% by mass or less. From the viewpoint of forming pressure-responsive particles that readily undergo phase transition by pressure, the total amount of n-butyl acrylate and 2-ethylhexyl acrylate with respect to the total amount of polymerization components of the styrene-based resin is, for example, preferably 5% by mass or more, more preferably 10% by mass or more, and even more preferably 15% by mass or more.

From the viewpoint of inhibiting the pressure-responsive particles from being fluidized in a state where no pressure is applied, the weight average molecular weight of the styrene-based resin is, for example, preferably 3,000 or higher, more preferably 4,000 or higher, and even more preferably 5,000 or higher. From the viewpoint of forming pressure-responsive particles that readily undergo phase transition by pressure, the weight average molecular weight of the styrene-based resin is, for example, preferably 60,000 or lower, more preferably 55,000 or lower, and even more preferably 50,000 or lower.

In the present disclosure, the weight average molecular weight of a resin is measured by gel permeation chromatography (GPC). The measurement of molecular weight by GPC is performed using HLC-8120GPC manufactured by Tosoh Corporation as a GPC device, TSKgel SuperHM-M (15 cm) manufactured by Tosoh Corporation as a column, and tetrahydrofuran as a solvent. The weight average molecular weight of a resin is calculated using a molecular weight calibration curve plotted using a monodisperse polystyrene standard sample.

From the viewpoint of inhibiting the pressure-responsive particles from being fluidized in a state where no pressure is applied, the glass transition temperature of the styrene-based resin is, for example, preferably 30° C. or higher, more preferably 40° C. or higher, and even more preferably 50° C. or higher. From the viewpoint forming pressure-responsive particles that readily undergo phase transition by pressure, the glass transition temperature of the styrene-based resin is, for example, preferably 110° C. or lower, more preferably 100° C. or lower, and even more preferably 90° C. or lower.

In the present disclosure, the glass transition temperature of a resin is determined from a differential scanning calorimetry curve (DSC curve) obtained by performing differential scanning calorimetry (DSC). More specifically, the glass transition temperature is determined according to "extrapolated glass transition onset temperature" described in the method for determining glass transition temperature in JIS K7121: 1987 "testing methods for transition temperature of plastics".

The glass transition temperature of a resin can be controlled by the type of polymerization components and the polymerization ratio between polymerization components. The higher the density of a flexible unit such as a methylene group, an ethylene group, or an oxyethylene group contained in the main chain is, the lower the glass transition temperature tends to be. Furthermore, the higher the density of a rigid unit such as an aromatic ring or a cyclohexane ring contained in the main chain is, the higher the glass transition temperature tends to be. In addition, the higher the density of an aliphatic group is in a side chain, the lower the glass transition temperature tends to be.

In the present exemplary embodiment, from the viewpoint of inhibiting the pressure-responsive particles from being fluidized in a state where no pressure is applied, the mass ratio of the styrene-based resin to all the pressure-responsive base particles is, for example, preferably 55% by mass or higher, more preferably 60% by mass or higher, and even more preferably 65% by mass or higher. From the viewpoint of forming pressure-responsive particles that readily undergo phase transition by pressure, the mass ratio of the styrene-based resin to all the pressure-responsive base particles is, for example, preferably 80% by mass or lower, more preferably 75% by mass or lower, and even more preferably 70% by mass or lower.

(Meth)Acrylic Acid Ester-Based Resin

The pressure-responsive base particles configuring the pressure-responsive particles according to the present exemplary embodiment contain a (meth)acrylic acid ester-based resin which contains at least two kinds of (meth)acrylic acid esters as polymerization component and in which the mass ratio of the (meth)acrylic acid esters to all polymerization components is 90% by mass or higher.

The mass ratio of the (meth)acrylic acid esters to all polymerization components of the (meth)acrylic acid ester-based resin is, for example, preferably 90% by mass or higher, more preferably 95% by mass or higher, even more preferably 98% by mass or higher, and still more preferably 100% by mass.

Examples of the (meth)acrylic acid ester include a (meth)acrylic acid alkyl ester, a (meth)acrylic acid carboxy-substituted alkyl ester, a (meth)acrylic acid hydroxy-substituted alkyl ester, a (meth)acrylic acid alkoxy-substituted alkyl ester, adi(meth)acrylic acid ester, and the like.

Examples of the (meth)acrylic acid alkyl ester include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclohexyl (meth)acrylate, dicyclopentanyl (meth)acrylate, isobornyl (meth)acrylate, and the like.

Examples of the (meth)acrylic acid carboxy-substituted alkyl ester include 2-carboxyethyl (meth)acrylate and the like.

Examples of the (meth)acrylic acid hydroxy-substituted alkyl ester include 2-hydroxyethyl (meth)acrylate, 2-hydroxypropyl (meth)acrylate, 3-hydroxypropyl (meth)acrylate, and 2-hydroxybutyl (meth)acrylate, 3-hydroxybutyl (meth)acrylate, 4-hydroxybutyl (meth)acrylate, and the like.

Examples of the (meth)acrylic acid alkoxy-substituted alkyl ester include 2-methoxyethyl (meth)acrylate and the like.

Examples of the di(meth)acrylic acid ester include ethylene glycol di(meth)acrylate, diethylene glycol di(meth)acrylate, triethylene glycol di(meth)acrylate, butanediol di(meth)acrylate, pentandiol di(meth)acrylate, hexanediol di(meth)acrylate, nonanediol di(meth)acrylate, decanediol di(meth)acrylate, and the like.

Examples of the (meth)acrylic acid ester include 2-(diethylamino)ethyl (meth)acrylate, benzyl (meth)acrylate, methoxypolyethylene glycol (meth)acrylate, and the like.

One kind of (meth)acrylic acid ester may be used singly, or two or more kinds of (meth)acrylic acid esters may be used in combination.

From the viewpoint of forming pressure-responsive particles that readily undergo phase transition by pressure and have excellent adhesiveness, as the (meth)acrylic acid esters, for example, (meth)acrylic acid alkyl esters are preferable, (meth)acrylic acid alkyl esters having an alkyl group with 2 to 10 carbon atoms are more preferable, (meth)acrylic acid alkyl esters having an alkyl group with 4 to 8 carbon atoms are even more preferable, and n-butyl acrylate and 2-ethylhexyl acrylate are particularly preferable. From the viewpoint of forming pressure-responsive particles that readily undergo phase transition by pressure, for example, it is preferable that the styrene-based resin and the (meth)acrylic acid ester-based resin contain the same kind of (meth)acrylic acid ester as a polymerization component.

From the viewpoint of forming pressure-responsive particles that readily undergo phase transition by pressure and have excellent adhesiveness, the mass ratio of the (meth)acrylic acid alkyl esters to all polymerization components of the (meth)acrylic acid ester-based resin is, for example, preferably 90% by mass or higher, more preferably 95% by mass or higher, even more preferably 98% by mass or higher, and still more preferably 100% by mass. As the (meth)acrylic acid alkyl esters mentioned herein, for example, (meth)acrylic acid alkyl esters having an alkyl group with 2 to 10 carbon atoms are preferable, and (meth)acrylic acid alkyl esters having an alkyl group with 4 to 8 carbon atoms are more preferable.

From the viewpoint of forming pressure-responsive particles that readily undergo phase transition by pressure and have excellent adhesiveness, the mass ratio between two kinds of (meth)acrylic acid esters having the highest mass proportion among the at least two kinds of (meth)acrylic acid esters contained in the (meth)acrylic acid ester-based resin as polymerization components is, for example, preferably 80:20 to 20:80, more preferably 70:30 to 30:70, and even more preferably 60:40 to 40:60.

As the two kinds of (meth)acrylic acid esters having the highest mass proportion among the at least two kinds of (meth)acrylic acid esters contained in the (meth)acrylic acid ester-based resin as polymerization components, for example, (meth)acrylic acid alkyl esters are preferable. As the (meth)acrylic acid alkyl esters mentioned herein, for example, (meth)acrylic acid alkyl esters having an alkyl group with 2 to 10 carbon atoms are preferable, and (meth)acrylic acid alkyl esters having an alkyl group with 4 to 8 carbon atoms are more preferable.

In a case where (meth)acrylic acid alkyl esters are two kinds of (meth)acrylic acid esters having the highest mass proportion among the at least two kinds of (meth)acrylic acid esters contained in the (meth)acrylic acid ester-based resin as polymerization components, from the viewpoint of forming pressure-responsive particles that readily undergo transition by pressure and have excellent adhesiveness, the difference in the number of carbon atoms between the alkyl groups in the two kinds of (meth)acrylic acid alkyl esters is, for example, preferably 1 or greater and 4 or less, more preferably 2 or greater and 4 or less, and even more preferably 3 or 4.

From the viewpoint of forming pressure-responsive particles that readily undergo phase transition by pressure and have excellent adhesiveness, the (meth)acrylic acid ester-based resin preferably contains, for example, n-butyl acrylate and 2-ethylhexyl acrylate as polymerization components, and particularly preferably contains n-butyl acrylate and 2-ethylhexyl acrylate as the two kinds of the (meth)acrylic acid esters having the highest proportion of mass among the at least two kinds of (meth)acrylic acid esters contained in the (meth)acrylic acid ester-based resin as polymerization components. The total amount of n-butyl acrylate and 2-ethylhexyl acrylate with respect to the total amount of polymerization components of the (meth)acrylic acid ester-based resin is, for example, preferably 90% by mass or more, more preferably 95% by mass or more, even more preferably 98% by mass or more, and still more preferably 100% by mass.

The (meth)acrylic acid ester-based resin may contain vinyl monomers other than the (meth)acrylic acid esters as polymerization components. Examples of vinyl monomers other than the (meth)acrylic acid esters include a (meth)

acrylic acid; styrene; styrene-based monomers other than styrene; (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene. One kind of each of these vinyl monomers may be used singly, or two or more kinds of these vinyl monomers may be used in combination.

In a case where the (meth)acrylic acid ester-based resin contains vinyl monomers other than the (meth)acrylic acid esters as polymerization components, as the vinyl monomers other than the (meth)acrylic acid esters, for example, at least acrylic acids or methacrylic acids are preferable, and acrylic acids are more preferable.

From the viewpoint of inhibiting the pressure-responsive particles from being fluidized in a state where no pressure is applied, the weight average molecular weight of the (meth)acrylic acid ester-based resin is, for example, preferably 50,000 or higher, more preferably 100,000 or higher, even more preferably 120,000 or higher, and still more preferably 150,000 or higher. From the viewpoint of forming pressure-responsive particles that readily undergo phase transition by pressure, the weight average molecular weight of the (meth)acrylic acid ester-based resin is, for example, preferably 250,000 or lower, more preferably 220,000 or lower, and even more preferably 200,000 or lower.

From the viewpoint forming pressure-responsive particles that readily undergo phase transition by pressure, the glass transition temperature of the (meth)acrylic acid ester-based resin is preferably, for example, 10° C. or lower, more preferably 0° C. or lower, and even more preferably −10° C. or lower. From the viewpoint of inhibiting the pressure-responsive particles from being fluidized in a state where no pressure is applied, the glass transition temperature of the (meth)acrylic acid ester-based resin is preferably, for example, −90° C. or higher, more preferably −80 or higher, and even more preferably −70° C. or higher.

In the present exemplary embodiment, from the viewpoint forming pressure-responsive particles that readily undergo phase transition by pressure, the mass ratio of the (meth)acrylic acid ester-based resin to all the pressure-responsive base particles is, for example, preferably 20% by mass or higher, more preferably 25% by mass or higher, and even more preferably 30% by mass or higher. From the viewpoint of inhibiting the pressure-responsive particles from being fluidized in a state where no pressure is applied, the mass ratio of the (meth)acrylic acid ester-based resin to all the pressure-responsive base particles is, for example, preferably 45% by mass or lower, more preferably 40% by mass or lower, and even more preferably 35% by mass or lower.

In the present exemplary embodiment, the total amount of the styrene-based resin and the (meth)acrylic acid ester-based resin contained in the pressure-responsive base particles with respect to the total amount of the pressure-responsive base particles is, for example, preferably 70% by mass or more, more preferably 80% by mass or more, even more preferably 90% by mass or more, still more preferably 95% by mass or more, and yet more preferably 100% by mass.

Other Resins

The pressure-responsive base particles may contain, for example, polystyrene; a non-vinyl-based resin such as an epoxy resin, a polyester resin, a polyurethane resin, a polyamide resin, a cellulose resin, a polyether resin, or a modified rosin; and the like. One kind of each of these resins may be used singly, or two or more of kinds of these resins may be used in combination.

Various Additives

As necessary, the pressure-responsive base particles contain a colorant (for example, a pigment or a dye), a release agent (for example, hydrocarbon-based wax; natural wax such as carnauba wax, rice wax, or candelilla wax; synthetic or mineral/petroleum wax such as montan wax; or ester-based wax such as a fatty acid ester or a montanic acid ester), a charge control agent, and the like.

In order to prepare the pressure-responsive particles according to the present exemplary embodiment as transparent pressure-responsive particles, the amount of a colorant in the pressure-responsive base particles with respect to the total amount of the pressure-responsive base particles is, for example, preferably 1.0% by mass or less. From the viewpoint of increasing transparency of the pressure-responsive particles, for example, the smaller the amount of a colorant, the better.

Structure of Pressure-Responsive Base Particles

The internal structure of the pressure-responsive base particles is preferably, for example, a sea-island structure. The sea-island structure is, for example, preferably a sea-island structure having a sea phase containing a styrene-based resin and island phases which are dispersed in the sea phase and contain a (meth)acrylic acid ester-based resin. The specific form of the styrene-based resin contained in the sea phase is as described above. The specific form of the (meth)acrylic acid ester-based resin contained in the island phases is as described above. Island phases that do not contain a (meth)acrylic acid ester-based resin may also be dispersed in the sea phase.

In a case where the pressure-responsive base particles have the sea-island structure, the average diameter of the island phases is preferably, for example, 200 nm or greater and 500 nm or less. In a case where the average diameter of the island phases is 500 nm or less, the pressure-responsive base particles readily undergo phase transition by pressure. In a case where the average diameter of the island phases is 200 nm or greater, the mechanical strength required for the pressure-responsive base particles (for example, the strength that prevents the particles from being deformed in a case where the particles are agitated in a developing machine) is excellent. In these respects, the average diameter of the island phases is, for example, more preferably 220 nm or greater and 450 nm or less, and even more preferably 250 nm or greater and 400 nm or less.

The average diameter of the island phases in the sea-island structure is controlled within the above range, for example, by a method of increasing the amount of the (meth)acrylic acid ester-based resin with respect to the amount of the styrene-based resin or a method of decreasing the time of keeping high temperature in a step of fusing/coalescing aggregated resin particles in the method for manufacturing pressure-responsive base particles that will be described later, and the like.

The confirmation of the sea-island structure and the measurement of the average diameter of island phases are performed by the following method.

The pressure-responsive particles are embedded in an epoxy resin and sliced with a diamond knife or the like. The prepared slices are stained with osmium tetroxide or ruthenium tetroxide in a desiccator. The stained slices are observed with a scanning electron microscope (SEM). The sea phase and island phases of the sea-island structure are distinguished by the light and shade caused by the degree of staining of the resin with osmium tetroxide or ruthenium tetroxide. By using this principle, the presence or absence of the sea-island structure is confirmed. One hundred island phases are randomly selected from the SEM image, the long diameter of each of the island phases is measured. The average of long diameters of 100 island phases is adopted as an average diameter.

The pressure-responsive base particles may be pressure-responsive base particles having a single-layer structure, or may be pressure-responsive base particles having a core-shell structure with a core portion and a shell layer coating the core portion. From the viewpoint of inhibiting the pressure-responsive particles from being fluidized in a state where no pressure is applied, it is preferable that the pressure-responsive base particles have, for example, a core-shell structure.

In a case where the pressure-responsive base particles have a core-shell structure, for example, it is preferable that the core portion contain a styrene-based resin and a (meth) acrylic acid ester-based resin, because then phase transition readily occurs by pressure. Furthermore, from the viewpoint of inhibiting the pressure-responsive particles from being fluidized in a state where no pressure is applied, for example, it is preferable that the shell layer contain a styrene-based resin. The specific form of the styrene-based resin is as described above. The specific form of the (meth)acrylic acid ester-based resin is as described above.

In a case where the pressure-responsive base particles have a core-shell structure, for example, it is preferable that the core portion have a sea phase which contains a styrene-based resin and island phases which are dispersed in the sea phase and contain a (meth)acrylic acid ester-based resin. It is preferable that the average diameter of the island phases be in the above range, for example. Furthermore, it is preferable that the core portion be configured as above and, for example, the shell layer contain a styrene-based resin. In this case, a structure is established in which the sea phase of the core portion and the shell layer are continuous, which allows the pressure-responsive base particles to readily undergo phase transition by pressure. The specific form of the styrene-based resin contained in the sea phase of the core portion and the shell layer is as described above. The specific form of the (meth)acrylic acid ester-based resin contained in the island phases of the core portion is as described above.

Examples of the resin contained in the shell layer include polystyrene; a non-vinyl-based resin such as an epoxy resin, a polyester resin, a polyurethane resin, a polyamide resin, a cellulose resin, a polyether resin, or a modified rosin; and the like. One kind of each of these resins may be used singly, or two or more of kinds of these resins may be used in combination.

From the viewpoint of inhibiting the deformation of the pressure-responsive base particles, the average thickness of the shell layer is, for example, preferably 120 nm or greater, more preferably 130 nm or greater, and even more preferably 140 nm or greater. From the viewpoint of causing the pressure-responsive base particles to readily undergo phase transition by pressure, the average thickness of the shell layer is, for example, preferably 550 nm or less, more preferably 500 nm or less, and even more preferably 400 nm or less.

The average thickness of the shell layer is measured by the following method.

The pressure-responsive particles are embedded in an epoxy resin and sliced with a diamond knife or the like. The prepared slices are stained with osmium tetroxide or ruthenium tetroxide in a desiccator. The stained slices are observed with a scanning electron microscope (SEM). Cross sections of 10 pressure-responsive base particles are randomly selected from the SEM image. For one pressure-responsive base particle, the thickness of the shell layer is measured at 20, and the average thereof is calculated. The average of 10 pressure-responsive base particles is adopted as the average thickness.

From the viewpoint of ease of handling of the pressure-responsive base particles, the number average particle diameter of the pressure-responsive base particles is, for example, preferably 4 μm or greater, more preferably 5 μm or greater, and even more preferably 6 μm or greater. From the viewpoint of causing all the pressure-responsive base particles to readily undergo phase transition by pressure, the number average particle diameter of the pressure-responsive base particles is, for example, preferably 12 μm or less, more preferably 10 μm or less, and even more preferably 9 μm or less.

The particle diameter of the pressure-responsive base particles is the diameter of a circle having the same area as the particle image (so-called circular equivalent diameter). The number average particle diameter of the pressure-responsive base particles is a particle diameter at 50% in a cumulative number-based particle size distribution accumulated from small particle size. The number average particle diameter of the pressure-responsive base particles is determined by capturing a scanning electron microscope (SEM) image of the pressure-responsive base particles and performing image analysis on at least 300 pressure-responsive base particles in the SEM image.

Inorganic Oxide Particles

Examples of the inorganic oxide particles include $SiO_2$, $TiO_2$, $Al_2O_3$, CUO, ZnO, $SnO_2$, $Fe_2O_3$, MgO, BaO, CaO, $K_2O$, $Na_2O$, $ZrO_2$, $CaO·SiO_2$, $K_2O·(TiO_2)_n$, $Al_2O_3·2SiO_2$, and the like. One kind of each of these inorganic oxide particles may be used singly, or two or more of kinds of these inorganic oxide particles may be used in combination.

As the inorganic oxide particles, from the viewpoint of easily adjusting the liberation rate of the inorganic oxide particles, for example, at least one kind of inorganic oxide particles selected from the group consisting of silica particles ($SiO_2$), titania particles ($TIO_2$), and alumina particles ($Al_2O_3$) are preferable, at least either silica particles or titania particles are more preferable, and silica particles are even more preferable.

The surface of the inorganic oxide particles may have had, for example, a hydrophobizing treatment. The hydrophobizing treatment is performed, for example, by immersing the inorganic oxide particles in a hydrophobizing agent. The hydrophobizing agent is not particularly limited, and examples thereof include a silane-based coupling agent, silicone oil, a titanate-based coupling agent, an aluminum-based coupling agent, and the like. One kind of each of these agents may be used singly, or two or more kinds of these agents may be used in combination. The amount of the hydrophobizing agent is, for example, 1 part by mass or more and 10 parts by mass or less with respect to 100 parts by mass of the inorganic oxide particles.

From the viewpoint of inhibiting an image on the adhesive surface from being lost in a case where the adhesive surface is peeled, the liberation rate of the inorganic oxide particles is, for example, 10% by mass or higher, preferably 15% by mass or higher, and more preferably 20% by mass or higher.

From the viewpoint of improving the adhesiveness of the pressure-responsive particles, the liberation rate of the inorganic oxide particles is, for example, 40% by mass or lower, preferably 35% by mass or lower, and more preferably 30% by mass or lower.

The liberation rate of the inorganic oxide particles is measured according to the following (1) to (3).

(1) The amount of the inorganic oxide particles included as an external additive in the pressure-responsive particles is determined.

The pressure-responsive particles are analyzed using an X-ray fluorescence method, and an amount Ma of the inorganic oxide particles included as an external additive in the pressure-responsive particles is determined.

(2) Ultrasonic waves are applied to the pressure-responsive particles, and the amount of inorganic oxide particles remaining in the pressure-responsive particles after the application of ultrasonic waves is determined.

The following operation is performed at room temperature of 25±1° C.

A 200 ml glass bottle is filled with 100 ml of deionized water and 5.5 ml of a 10% by mass aqueous Triton X-100 solution, thereby preparing a mixed solution. The pressure-responsive particles (5 g) are added to the mixed solution, the solution is slowly agitated with a glass rod 30 times in a circular motion so that the pressure-responsive particles are dispersed, and the solution is left to stand for 1 hour or longer. The solution is then slowly agitated 20 times with a glass rod in a circular motion so that the pressure-responsive particles are dispersed, and ultrasonic waves are applied to the obtained dispersion for 1 minute at an output of 20 W and a frequency of 20 kHz by using an ultrasonic vibrator (trade name: US-300AT, manufactured by NISSEI Corporation.).

Thereafter, the dispersion is suction-filtered using "ADVANTECH qualitative filter paper No. 2" and washed with deionized water. This process is performed twice. Then, the solids remaining on the filter paper are dried.

The dried solids are analyzed by an X-ray fluorescence method, and an amount Mb of inorganic oxide particles remaining in the pressure-responsive particles after the application of ultrasonic waves is determined.

(3) The liberation rate of the inorganic oxide particles is calculated from the following formula.

Liberation rate of inorganic oxide particles (% by mass)=$(Ma-Mb) \div Ma \times 100$ The liberation rate of the inorganic oxide particles can be adjusted by the amount of the inorganic oxide particles added to the exterior of the pressure-responsive base particles with respect to the amount of the pressure-responsive base particles. The larger the amount of the inorganic oxide particles added to the exterior of the pressure-responsive base particles is, the higher the liberation rate of the inorganic oxide particles tends to be.

From the viewpoint of controlling the liberation rate of the inorganic oxide particles, silica particles having a particle diameter of 100 nm or less (called "small-sized silica particles" in the present disclosure) and silica particles having a particle diameter greater than 100 nm (called "large-sized silica particles" in the present disclosure) may be used together. In a case where the small-sized silica particles and the large-sized silica particles are added to the exterior of the pressure-responsive base particles, the small-sized silica particles tend to be relatively strongly attached to the surface of the pressure-responsive base particles, while the large-sized silica particles are relatively weakly attached to the surface of the pressure-responsive base particles. The liberation rate of the inorganic oxide particles can be adjusted by the amount of the small-sized silica particles and the large-sized silica particles added to the exterior of the pressure-responsive base particles.

From the viewpoint of inhibiting the image on the adhesive surface from being lost in a case where the adhesive surface is peeled, the average primary particle diameter db of all the inorganic oxide particles is, for example, preferably 50 nm or greater, more preferably 80 nm or greater, and even more preferably 90 nm or greater.

From the viewpoint of improving the adhesiveness of the pressure-responsive particles, the average primary particle diameter db of all the inorganic oxide particles is, for example, preferably 200 nm or less, more preferably 180 nm or less, and even more preferably 150 nm or less.

From the viewpoint of inhibiting the image on the adhesive surface from being lost in a case where the adhesive surface is peeled, db/Da which is a ratio of a number average particle diameter db of the inorganic oxide particles to a number average particle diameter Da of the pressure-responsive base particles is, for example, preferably 0.002 or higher, more preferably 0.005 or higher, and even more preferably 0.008 or higher.

From the viewpoint of improving the adhesiveness of the pressure-responsive particles, db/Da which is a ratio of a number average particle diameter db of the inorganic oxide particles to a number average particle diameter Da of the pressure-responsive base particles is, for example, preferably 0.020 or lower, more preferably 0.015 or lower, and even more preferably 0.010 or lower.

The primary particle diameter of the inorganic oxide particles is the diameter of a circle having the same area as the primary particle image (so-called circular equivalent diameter). The average primary particle diameter of the inorganic oxide particles is a particle diameter at 50% in a cumulative number-based primary particle size distribution accumulated from small particle size. The primary particle diameter of the inorganic oxide particles is determined by capturing a scanning electron microscope (SEM) image of the pressure-responsive particles in which the inorganic oxide particles are added to the exterior of the pressure-responsive base particles, and performing image analysis on at least 300 inorganic oxide particles on the pressure-responsive base particles in the SEM image.

The primary particle diameter of the inorganic oxide particles can be adjusted by performing a pulverization treatment and a classification treatment on the inorganic oxide particles.

From the viewpoint of inhibiting the image on the adhesive surface from being lost in a case where the adhesive surface is peeled, the total amount of the inorganic oxide particles added to the exterior of the pressure-responsive base particles with respect to 100 parts by mass of the pressure-responsive base particles is, for example, preferably 1 part by mass or more, more preferably 1.5 parts by mass or more, and even more preferably 2 parts by mass or more.

From the viewpoint of improving the adhesiveness of the pressure-responsive particles, the total amount of the inorganic oxide particles added to the exterior of the pressure-responsive base particles is, for example, preferably 10 parts by mass or less, more preferably 8 parts by mass or less, and even more preferably 5 parts by mass or less.

Other External Additives

Examples of external additives also include resin particles (resin particles such as polystyrene, polymethylmethacrylate, and melamine resins), a cleaning activator (for example, a metal salt of a higher fatty acid represented by zinc stearate or fluorine-based polymer particles), and the like.

Characteristics of Pressure-Responsive Particles

In a case where the pressure-responsive particles according to the present exemplary embodiment have at least two glass transition temperatures, presumably, one of the glass transition temperatures may be the glass transition temperature of the styrene-based resin, and the other may be the glass transition temperature of the (meth)acrylic acid ester-based resin.

The pressure-responsive particles according to the present exemplary embodiment may have three or more glass transition temperatures. However, it is preferable that the pressure-responsive particles have two glass transition temperatures, for example. The pressure-responsive particles have two glass transition temperatures in a case where the pressure-responsive particles contain only the styrene-based resin and the (meth)acrylic acid ester-based resin as resins; or in a case where the pressure-responsive particles contain small amounts of other resins that are none of the styrene-based resin and the (meth)acrylic acid ester-based resin (for example, in a case where the content of other resins is 5% by mass or less with respect to the total content of the pressure-responsive particles).

The pressure-responsive particles according to the present exemplary embodiment have at least two glass transition temperatures, and the difference between the lowest glass transition temperature and the highest glass transition temperature is 30° C. or higher. From the viewpoint of causing the pressure-responsive particles to readily undergo phase transition by pressure, the difference between the lowest glass transition temperature and the highest glass transition temperature is, for example, more preferably 40° C. or higher, even more preferably 50° C. or higher, and still more preferably 60° C. or higher. The upper limit of the difference between the lowest glass transition temperature and the highest glass transition temperature is, for example, 140° C. or lower, 130° C. or lower, or 120° C. or lower.

From the viewpoint causing the pressure-responsive particles to readily undergo phase transition by pressure, the lowest glass transition temperature of the pressure-responsive particles according to the present exemplary embodiment is, for example, preferably 10° C. or lower, more preferably 0° C. or lower, and even more preferably −10° C. or lower. From the viewpoint of inhibiting the pressure-responsive particles from being fluidized in a state where no pressure is applied, the lowest glass transition temperature of the pressure-responsive particles according to the present exemplary embodiment is, for example, preferably −90° C. or higher, more preferably −80 or higher, and even more preferably −70° C. or higher.

From the viewpoint of inhibiting the pressure-responsive particles from being fluidized in a state where no pressure is applied, the highest glass transition temperature of the pressure-responsive particles according to the present exemplary embodiment is, for example, preferably 30° C. or higher, more preferably 40° C. or higher, and even more preferably 50° C. or higher. From the viewpoint of causing the pressure-responsive particles to readily undergo phase transition by pressure, the highest glass transition temperature of the pressure-responsive particles according to the present exemplary embodiment is, for example, preferably 70° C. or lower, more preferably 65° C. or lower, and even more preferably 60° C. or lower.

In the present disclosure, the glass transition temperature of the pressure-responsive particles is determined from a differential scanning calorimetry curve (DSC curve) obtained by performing differential scanning calorimetry (DSC). More specifically, the glass transition temperature is determined according to "extrapolated glass transition onset temperature" described in the method for determining glass transition temperature in JIS K7121: 1987 "testing methods for transition temperature of plastics".

The pressure-responsive particles according to the present exemplary embodiment are pressure-responsive particles that undergo phase transition by pressure and satisfy the following Formula 1.

$$10°\ C. \leq T1 - T2 \quad \text{Formula 1}$$

In Formula 1, T1 is a temperature at which the pressure-responsive particles have a viscosity of 10,000 Pa·s under a pressure of 1 MPa, and T2 is a temperature at which the pressure-responsive particles have a viscosity of 10,000 Pa·s under a pressure of 10 MPa.

From the viewpoint of causing the pressure-responsive particles to readily undergo phase transition by pressure, the temperature difference (T1−T2) is, for example, 10° C. or higher, preferably 15° C. or higher, and more preferably 20° C. or higher. From the viewpoint of inhibiting the pressure-responsive particles from being fluidized in a state where no pressure is applied, the temperature difference (T1−T2) is, for example, preferably 120° C. or lower, more preferably 100° C. or lower, even more preferably 80° C. or lower.

The temperature T1 is, for example, preferably 140° C. or lower, more preferably 130° C. or lower, even more preferably 120° C. or lower, and still more preferably 115° C. or lower. The lower limit of the temperature T1 is, for example, preferably 80° C. or higher, and more preferably 85° C. or higher.

The temperature T2 is, for example, preferably 40° C. or higher, more preferably 50° C. or higher, and even more preferably 60° C. or higher. The upper limit of the temperature T2 is, for example, preferably 85° C. or lower.

For example, a temperature difference (T1−T3) between a temperature T1 at which the pressure-responsive particles have a viscosity of 10,000 Pa·s under a pressure of 1 MPa and a temperature T3 at which the pressure-responsive particles have a viscosity of 10,000 Pa·s under a pressure of 4 MPa is an index showing how readily the pressure-responsive particles undergo phase transition by pressure. The temperature difference (T1−T3) is, for example, preferably 5° C. or higher. From the viewpoint of causing the pressure-responsive particles according to the present exemplary embodiment to readily undergo phase transition by pressure, the temperature difference (T1−T3) is, for example, preferably 5° C. or higher, and more preferably 10° C. or higher.

The temperature difference (T1−T3) is generally 25° C. or lower.

From the viewpoint of obtaining a temperature difference (T1−T3) of 5° C. or higher, the temperature T3 at which the pressure-responsive particles according to the present exemplary embodiment have a viscosity of 10000 Pa·s under a pressure of 4 MPa is, for example, preferably 90° C. or lower, more preferably 85° C. or lower, and even more preferably 80° C. or lower. The lower limit of the temperature T3 is, for example, preferably 60° C. or higher.

The temperature T1, the temperature T2, and the temperature T3 are determined by the following method.

The pressure-responsive particles are compressed, thereby preparing a pellet-like sample. The pellet-like sample is set in a flow tester (CFT-500 manufactured by Shimadzu Corporation), a pressure set to 1 MPa is applied to the sample, and the viscosity of the sample at each temperature under 1 MPa is measured. From the obtained viscosity graph, the temperature T1 at which the viscosity is $10^4$ Pa·s under the applied pressure of 1 MPa is determined. The temperature T2 is determined by the same method as the method used for determining the temperature T1, except that the applied pressure is changed to 10 MPa from 1 MPa. The temperature T3 is determined by the same method as the method used for determining the temperature T1, except that the applied pressure is changed to 4 MPa from 1 MPa. From the temperature T1 and the temperature T2, the temperature difference (T1–T2) is calculated. From the temperature T1 and the temperature T3, the temperature difference (T1–T3) is calculated.

Method for Manufacturing Pressure-Responsive Particles

The pressure-responsive particles according to the present exemplary embodiment can be obtained by manufacturing pressure-responsive base particles and then adding an external additive to the exterior of the pressure-responsive base particles.

The pressure-responsive base particles may be manufactured by any of a dry manufacturing method (for example, a kneading and pulverizing method or the like) or a wet manufacturing method (for example, an aggregation and coalescence method, a suspension polymerization method, a dissolution suspension method, or the like). There are no particular restrictions on these manufacturing methods, and known manufacturing methods are adopted. Among these, for example, it is preferable to use the aggregation and coalescence method to obtain the pressure-responsive base particles.

In a case where the aggregation and coalescence method is used to manufacture the pressure-responsive base particles, for example, the pressure-responsive base particles are manufactured through a step of preparing a styrene-based resin particle dispersion in which styrene-based resin particles containing a styrene-based resin are dispersed (styrene-based resin particle dispersion preparation step), a step of forming composite resin particles containing a styrene-based resin and a (meth)acrylic acid ester-based resin by polymerizing a (meth)acrylic acid ester-based resin in the styrene-based resin particle dispersion (composite resin particle forming step), a step of forming aggregated particles by aggregating the composite resin particles in a composite resin particle dispersion in which the composite resin particles are dispersed (aggregated particle forming step), and a step of fusing/coalescing the aggregated particles by heating the aggregated particle dispersion in which the aggregated particles are dispersed so that pressure-responsive base particles are formed (fusion/coalescence step).

The details of each step will be described below.

Hereinafter, a method for obtaining pressure-responsive base particles containing none of a colorant and a release agent will be described. A colorant, a release agent, and other additives may be used as necessary. In a case where a colorant and a release agent are incorporated into the pressure-responsive base particles, the composite resin particle dispersion, a colorant particle dispersion, and a release agent particle dispersion are mixed together, and then the fusion/coalescence step is performed. The colorant particle dispersion and the release agent particle dispersion can be prepared, for example, by mixing together the materials and then performing a dispersion treatment using a known disperser.

Styrene-Based Resin Particle Dispersion Preparation Step

The styrene-based resin particle dispersion is, for example, a dispersion obtained by dispersing styrene-based resin particles in a dispersion medium by using a surfactant.

Examples of the dispersion medium include aqueous media such as water and alcohols. One kind of each of these media may be used singly, or two or more kinds of these media may be used in combination.

Examples of the surfactant include an anionic surfactant based on a sulfuric acid ester salt, a sulfonate, a phosphoric acid ester salt, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. The nonionic surfactant may be used in combination with an anionic surfactant or a cationic surfactant. Among these, for example, an anionic surfactant is preferable. One kind of surfactant may be used singly, or two or more kinds of surfactants may be used in combination.

The styrene-based resin particles are dispersed in a dispersion medium, for example, by a method of mixing the styrene-based resin with the dispersion medium and dispersing the resin by agitating the mixture with a rotary shearing homogenizer, a ball mill having a medium, a sand mill, a dyno mill, or the like.

In addition, the styrene-based resin particles are dispersed in a dispersion medium, for example, by an emulsion polymerization method. Specifically, the polymerization components of the styrene-based resin and a chain transfer agent or a polymerization initiator are mixed together and then further mixed with an aqueous medium containing a surfactant, the mixture is agitated so that an emulsion is prepared, and the styrene-based resin is polymerized in the emulsion. At this time, as the chain transfer agent, it is preferable to use dodecanethiol, for example.

The volume average particle diameter of the styrene-based resin particles dispersed in the styrene-based resin particle dispersion is, for example, preferably 100 nm or greater and 250 nm or less, more preferably 120 nm or greater and 220 nm or less, and even more preferably 150 nm or greater and 200 nm or less.

The volume average particle diameter of the resin particles contained in the resin particle dispersion is measured by a laser diffraction-type particle size distribution analyzer (for example, LA-700 manufactured by HORIBA, Ltd). The volume average particle diameter of the resin particles is a volume average particle diameter at 50% (D50v) in a cumulative volume-based particle size distribution accumulated from small particle size.

The content of the styrene-based resin particles contained in the styrene-based resin particle dispersion is, for example, preferably 30% by mass or higher and 60% by mass or lower, and more preferably 40% by mass or higher and 50% by mass or lower.

Composite Resin Particle Forming Step

The composite resin particles containing a styrene-based resin and a (meth)acrylic acid ester-based resin are formed by mixing together the styrene-based resin particle dispersion and polymerization components of a (meth)acrylic acid ester-based resin and polymerizing the (meth)acrylic acid ester-based resin in the styrene-based resin particle dispersion.

The composite resin particles are, for example, preferably resin particles containing a styrene-based resin and a (meth)acrylic acid ester-based resin that are in a microphase-separated state. Such resin particles can be manufactured, for example, by the following method.

Polymerization components of a (meth)acrylic acid ester-based resin (group of monomers including at least two kinds of (meth)acrylic acid esters) are added to the styrene-based resin particle dispersion, and an aqueous medium is added thereto as necessary. Then, while being slowly agitated, the dispersion is heated to a temperature equal to or higher than the glass transition temperature of the styrene-based resin (for example, a temperature higher than the glass transition temperature of the styrene-based resin by 10° C. to 30° C.). Thereafter, in a state where the temperature is being maintained, an aqueous medium containing a polymerization initiator is slowly added dropwise to the dispersion, and then the dispersion is continuously agitated for a long period of time that is 1 hour or longer and 15 hours or shorter. At this time, it is preferable to use, for example, ammonium persulfate as the polymerization initiator.

Presumably, in a case where the above method is adopted, the styrene-based resin particles may be impregnated with monomers and the polymerization initiator, and the (meth) acrylic acid ester may be polymerized in the styrene-based resin particles, although the detailed mechanism is unclear. Presumably, as a result, the (meth)acrylic acid ester-based resin may be incorporated into the styrene-based resin particles, and composite resin particles may be obtained in which the styrene-based resin and the (meth)acrylic acid ester-based resin are in a microphase-separated state.

During or after the manufacturing the composite resin particles, polymerization components (that is, styrene and other vinyl monomers) of the styrene-based resin may be added to the dispersion in which the composite resin particles are dispersed, and the polymerization reaction may be continued. Presumably, in a case where the polymerization reaction is continued in this way, composite resin particles may be obtained in which the styrene-based resin and the (meth)acrylic acid ester-based resin are in a microphase-separated state on the inside of the particles, and the styrene-based resin is attached to the surface of the particles. The pressure-responsive particles manufactured using the composite resin particles including a styrene-based resin attached to the surface of the particles generate relatively small amounts of coarse powder.

It is preferable that other vinyl monomers, which are polymerization components of the styrene-based resin to be attached to the surface of the composite resin particles, include the same kind of monomer as at least one kind of the monomer configuring the styrene-based resin or the (meth) acrylic acid ester-based resin that is in the composite resin particles. Specifically, for example, it is preferable that other vinyl monomers include at least one of n-butyl acrylate or 2-ethylhexyl acrylate.

The volume average particle diameter of the composite resin particles dispersed in the composite resin particle dispersion is, for example, preferably 140 nm or greater and 300 nm or less, more preferably 150 nm or greater and 280 nm or less, and even more preferably 160 nm or greater and 250 nm or less.

The content of the composite resin particles contained in the composite resin particle dispersion is, for example, preferably 20% by mass or higher and 50% by mass or lower, and more preferably 30% by mass or higher and 40% by mass or lower.

Aggregated Particle Forming Step

By aggregating the composite resin particles in the composite resin particle dispersion, aggregated particles having a diameter close to the diameter of the target pressure-responsive base particles are formed.

Specifically, for example, an aggregating agent is added to the composite resin particle dispersion, the pH of the composite resin particle dispersion is adjusted so that the dispersion is acidic (for example, pH of 2 or higher and 5 or lower), and a dispersion stabilizer is added thereto as necessary. Then, the dispersion is heated to a temperature close to the glass transition temperature of the styrene-based resin (specifically, for example, to a temperature in a range of a temperature equal to the glass transition temperature of the styrene-based resin −30° C. to a temperature equal to the glass transition temperature of the styrene-based resin −10° C.) so that the composite resin particles are aggregated, thereby forming aggregated particles.

In the aggregated particle forming step, in a state where the composite resin particle dispersion is being agitated with a rotary shearing homogenizer, an aggregating agent may be added thereto at room temperature (for example, 25° C.), the pH of the composite resin particle dispersion may be adjusted so that the dispersion is acidic (for example, pH of 2 or higher and 5 or lower), a dispersion stabilizer may be added to the dispersion as necessary, and then the dispersion may be heated.

Examples of the aggregating agent include a surfactant having a polarity opposite to the polarity of the surfactant contained in the composite resin particle dispersion, an inorganic metal salt, and a metal complex having a valency of 2 or higher. In a case where a metal complex is used as the aggregating agent, the amount of the surfactant used is reduced, and the charging characteristics are improved.

In addition to the aggregating agent, an additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Fusion/Coalescence Step

The aggregated particle dispersion in which the aggregated particles are dispersed is then heated to, for example, a temperature equal to or higher than the glass transition temperature of the styrene-based resin (for example, a temperature higher than the glass transition temperature of the styrene-based resin by 10° C. to 30° C.) so that the aggregated particles are fused/coalesce, thereby forming pressure-responsive base particles.

The pressure-responsive base particles obtained through the above steps usually have a sea-island structure having a sea phase which contains the styrene-based resin and island phases which are dispersed in the sea phase and contain the (meth)acrylic acid ester-based resin. Presumably, although the styrene-based resin and the (meth)acrylic acid ester-based resin in the composite resin particles are in a microphase-separated state, in the fusion/coalescence step, the styrene-based resin particles may gather and form the sea phase, and the (meth)acrylic acid ester-based resin particles may gather and form the island phases.

The average diameter of the island phases in the sea-island structure can be controlled, for example, by increasing or decreasing the amount of the styrene-based resin particle dispersion or the amount of at least two kinds of (meth)acrylic acid esters used in the composite resin particle forming step, increasing or decreasing the time of maintaining the high temperature in the fusion/coalescence step, and the like.

The pressure-responsive base particles having a core-shell structure are manufactured, for example, through a step of mixing together the aggregated particle dispersion with the styrene-based resin particle dispersion after the aggregated particle dispersion is obtained and aggregating the particles so that the styrene-based resin particles are additionally attached to the surface of the aggregated particles and that second aggregated particles are formed, and a step of heating a second aggregated particle dispersion in which the second aggregated particles are dispersed, so that the second aggregated particles are fused/coalesce and that pressure-responsive base particles having a core-shell structure are formed.

The pressure-responsive base particles having a core-shell structure obtained through the above steps have a shell layer containing the styrene-based resin. Instead of the styrene-based resin particle dispersion, a resin particle dispersion in which a different kind of resin particles are dispersed may be used to form a shell layer containing a different kind of resin.

After the fusion/coalescence step ends, the pressure-responsive base particles formed in a solution may be subjected to known washing step, solid-liquid separation step, and drying step so that dry pressure-responsive base particles are obtained. As the washing step, from the viewpoint of charging properties, for example, it is preferable to sufficiently perform displacement washing using deionized water. As the solid-liquid separation step, from the viewpoint of productivity, for example, it is preferable to perform suction filtration, pressure filtration, or the like. As the drying step, from the viewpoint of productivity, for example, it is preferable to perform freeze-drying, flush drying, fluidized drying, vibratory fluidized drying, or the like.

Then, for example, by adding an external additive to the obtained dry pressure-responsive base particles and mixing together the external additive and the particles, the pressure-responsive particles according to the present exemplary embodiment are manufactured. The mixing may be performed, for example, using a V blender, a Henschel mixer, a Lodige mixer, or the like. Furthermore, coarse particles of the pressure-responsive particles may be removed as necessary by using a vibratory sieving machine, a pneumatic sieving machine, or the like.

Cartridge

The cartridge according to the present exemplary embodiment is a cartridge that accommodates the pressure-responsive particles according to the present exemplary embodiment and is attached to and detached from an apparatus for manufacturing a printed matter. In a case where the cartridge is mounted on the apparatus for manufacturing a printed matter, through a supply pipe, the cartridge is connected to an arrangement unit which is included in the apparatus for manufacturing a printed matter and arranges the pressure-responsive particles on a recording medium.

In a case where the pressure-responsive particles are supplied to the arrangement unit from the cartridge, and thus the cartridge has run out of the pressure-responsive particles, the cartridge is replaced.

Apparatus for manufacturing printed matter, method for manufacturing printed matter, and printed matter The apparatus for manufacturing a printed matter according to the present exemplary embodiment includes an arrangement unit that accommodates the pressure-responsive particles according to the present exemplary embodiment and arranges the pressure-responsive particles on a recording medium, and a crimping unit that folds and crimps the recording medium or stacks and crimps the recording medium and another recording medium together.

The arrangement unit may include, for example, an application device that applies the pressure-responsive particles onto a recording medium, and a fixing device that fixes the pressure-responsive particles applied onto the recording medium to the recording medium.

The crimping unit includes, for example, a folding device that folds the recording medium on which the pressure-responsive particles are arranged or a stacking device that stacks another recording medium on the recording medium on which the pressure-responsive particles are arranged, and a pressing device that presses the stacked recording media.

The pressing device included in the crimping unit applies pressure to the recording medium on which the pressure-responsive particles are arranged. As a result, the pressure-responsive particles are fluidized on the recording medium and exhibit adhesiveness.

The method for manufacturing a printed matter according to the present exemplary embodiment is performed by the apparatus for manufacturing a printed matter according to the present exemplary embodiment. The method for manufacturing a printed matter according to the present exemplary embodiment includes an arrangement step of using the pressure-responsive particles according to the present exemplary embodiment and arranging the pressure-responsive particles on a recording medium, and a crimping step of folding and crimping the recording medium or stacking and crimping the recording medium and another recording medium together.

The arrangement step may include, for example, a step of applying the pressure-responsive particles on a recording medium, and a step of fixing the pressure-responsive particles applied on the recording medium to the recording medium.

The crimping step includes, for example, a folding step of folding the recording medium or a stacking step of stacking the recording medium and another recording medium together and a pressing step of pressing the stacked recording media.

The pressure-responsive particles may be arranged on the entire surface of a recording medium or on a part of a recording medium. The pressure-responsive particles are arranged in one or more layers on a recording medium. The layer of the pressure-responsive particles may be a continuous layer that extends in the plane direction of a recording medium or a discontinuous layer extends in the plane direction of a recording medium. The layer of the pressure-responsive particles may be a layer in which the pressure-responsive particles are arranged as they are, or may be a layer in which adjacent pressure-responsive particles are arranged in a fused state.

On the recording medium, the amount of the pressure-responsive particles (for example, preferably transparent pressure-responsive particles) in a region where the particles are arranged is, for example, 0.5 $g/m^2$ or more and 50 $g/m^2$ or less, 1 $g/m^2$ or more and 40 $g/m^2$ or less, or 1.5 $g/m^2$ or more and 30 $g/m^2$ or less. The thickness of the layer of pressure-responsive particles (for example, preferably transparent pressure-responsive particles) on the recording medium is, for example, 0.2 μm or greater and 25 μm or less, 0.4 μm or greater and 20 μm or less, or 0.6 μm or greater and 15 μm or less.

Examples of the recording medium used in the apparatus for manufacturing a printed matter according to the present exemplary embodiment include paper, coated paper with surface coated with a resin or the like, fabric, non-woven fabric, a resin film, a resin sheet, and the like. The recording medium may have an image on one surface or both surfaces thereof.

An example of the apparatus for manufacturing a printed matter according to the present exemplary embodiment will be shown below, but the present exemplary embodiment is not limited thereto.

FIG. 1 is a schematic block diagram showing an example of the apparatus for manufacturing a printed matter according to the present exemplary embodiment. The apparatus for manufacturing a printed matter shown in FIG. 1 includes an arrangement unit 100 and a crimping unit 200 disposed on the downstream of the arrangement unit 100. The arrow shows the transport direction of a recording medium.

The arrangement unit 100 is a device that uses the pressure-responsive particles according to the present exemplary embodiment and arranges the pressure-responsive particles on a recording medium P. The recording medium. P has an image formed in advance on one surface or both surfaces of the medium.

The arrangement unit 100 includes an application device 110 and a fixing device 120 that is disposed on the downstream of the application device 110.

The application device 110 applies pressure-responsive particles M onto the recording medium P. Examples of the application method that the application device 110 adopts include a spray method, a bar coating method, a die coating method, a knife coating method, a roll coating method, a reverse roll coating method, a gravure coating method, a screen printing method, an inkjet method, a laminating method, an electrophotographic method, and the like. A liquid composition appropriate for the application method may be prepared by dispersing the pressure-responsive particles M in a dispersion medium, and used in the application device 110.

The recording medium P to which the pressure-responsive particles M are applied by the application device 110 is transported to the fixing device 120.

The fixing device 120 is, for example, a heating device which includes a heat source and heats the pressure-responsive particles M on the passing recording medium P so that the pressure-responsive particles M are fixed onto the recording medium P; a pressing device which includes a pair of pressing members (roll/roll or belt/roll) and presses the passing recording medium P so that the pressure-responsive particles M are fixed onto the recording medium. P; a pressing and heating device which includes a pair of pressing members (rolls/roll or belt/roll) each having an internal heat source and presses and heats the passing recording medium P so that the pressure-responsive particles M are fixed onto the recording medium P; or the like.

In a case where the fixing device 120 has a heat source, the surface temperature of the recording medium P heated by the fixing device 120 is, for example, preferably 10° C. or higher and 80° C. or lower, more preferably 20° C. or higher and 60° C. or lower, and even more preferably 30° C. or higher and 50° C. or lower.

In a case where the fixing device 120 has a pressing member, the pressure applied to the recording medium P by the pressing member may be lower than the pressure applied to a recording medium P2 by a pressing device 230.

By passing through the arrangement unit 100, the recording medium P turns into a recording medium P1 in which the pressure-responsive particles M are applied onto the image. The recording medium P1 is transported to the crimping unit 200.

In the apparatus for manufacturing a printed matter according to the present exemplary embodiment, the arrangement unit 100 and the crimping unit 200 may be close to each other or separated from each other. In a case where the arrangement unit 100 and the crimping unit 200 are separated from each other, the arrangement unit 100 and the crimping unit 200 are connected to each other, for example, through a transport unit (for example, a belt conveyor) that transports the recording medium P1.

The crimping unit 200 is a unit that includes a folding device 220 and the pressing device 230, and folds and crimps the recording medium P1.

The folding device 220 folds the recording medium P1 passing through the device so as to prepare a folded recording medium P2. The recording medium P2 may be folded in half, thirds, or quarters, for example. Furthermore, only a part of the recording medium P2 may be folded. The pressure-responsive particles M are arranged on at least a part of at least one of two facing surfaces of the recording medium P2.

The folding device 220 may have a pair of pressing members (for example, roll/roll or belt/roll) that applies pressure to the recording medium P2. The pressure applied to the recording medium P2 by the pressing member of the folding device 220 may be lower than the pressure applied to the recording medium P2 by the pressing device 230.

The crimping unit 200 may include, instead of the folding device 220, a stacking device that stacks the recording medium P1 and another recording medium together. The recording medium P1 and another recording medium are stacked together, for example, in a manner in which one sheet of another recording medium is stacked on the recording medium P1, a manner in which one sheet of another recording medium is stacked on a plurality of sites within the recording medium P1, and the like. The aforementioned another recording medium may be a recording medium having an image formed in advance on one surface or both surfaces thereof, a recording medium with no image, or a crimped printed matter prepared in advance.

The recording medium P2 having passed through the folding device 220 (or the stacking device) is transported to the pressing device 230.

The pressing device 230 includes a pair of pressing members (that is, pressing rolls 231 and 232). The outer peripheral surfaces of the pressing roll 231 and the pressing roll 232 are in contact with each other so that the pressing rolls are pressed against each other. In this way, the pressing rolls apply pressure to the passing recording medium P2. The pair of pressing members included in the pressing device 230 is not limited to the combination of pressing rolls, and may be a combination of a pressing roll and a pressing belt or a combination of pressing belts.

In a case where pressure is applied to the recording medium P2 passing through the pressing device 230, the pressure-responsive particles M on the recording medium P2 are fluidized by the pressure and exhibit adhesiveness.

The pressing device 230 may or may not have an internal heat source (for example, a halogen heater) for heating the recording medium P2. Even though the pressing device 230 does not have an internal heat source, the internal temperature of the pressing device 230 may be increased to a temperature equal to or higher than the environmental temperature by heat generated by a motor or the like included in the pressing device 230.

In a case where the recording medium P2 passes through the pressing device 230, the folded surfaces adhere to each other by the fluidized pressure-responsive particles M, and a crimped printed matter P3 is prepared. Two facing surfaces of the crimped printed matter P3 partially or totally adhere to each other.

The completed crimped printed matter P3 is transported out of the pressing device 230.

A first form of the crimped printed matter P3 is a crimped printed matter including a folded recording medium in which the facing surfaces of the medium have adhered to each other by the pressure-responsive particles M. The crimped printed matter P3 in this form is manufactured by the apparatus for manufacturing a printed matter including the folding device 220.

A second form of the crimped printed matter P3 is a crimped printed matter including a plurality of stacked recording media in which the facing surfaces of the media have adhered to each other by the pressure-responsive particles M. The crimped printed matter P3 in this form is manufactured by the apparatus for manufacturing a crimped printed matter including a stacking device.

The apparatus for manufacturing a printed matter according to the present exemplary embodiment is not limited to the apparatus in which the recording medium P2 is continuously transported to the pressing device 230 from the folding device 220 (or the stacking device). The apparatus for manufacturing a printed matter according to the present exemplary embodiment may be a device in which the recording medium P2 transported out of the folding device 220 (or the stacking device) is kept until the amount of the kept recording medium P2 reached a predetermined amount and then transported to the pressing device 230.

In the apparatus for manufacturing a printed matter according to the present exemplary embodiment, the folding device 220 (or the stacking device) and a crimping and pressing device 230 may be close to each other or separated from each other. In a case where the folding device 220 (or the stacking device) and the crimping and pressing device 230 are separated from each other, the folding device 220 (or the stacking device) and the crimping and pressing device 230 are connected to each other, for example, through a transport unit (for example, a belt conveyor) that transports the recording medium P2.

The apparatus for manufacturing a printed matter according to the present exemplary embodiment may include a cutting unit that cuts the recording medium in a predetermined size. The cutting unit is, for example, a cutting unit that is disposed between the arrangement unit 100 and the crimping unit 200 and cuts off a region which is a part of the recording medium P1 and in which no pressure-responsive particles M are arranged; a cutting unit that is disposed between the folding device 220 and the pressing device 230 and cuts off a region which is a part of the recording medium P2 and in which no pressure-responsive particles M are arranged; a cutting unit that is disposed on the downstream of the crimping unit 200 and cuts off a region which is a part of the crimped printed matter P3 and in which adhesion by the pressure-responsive particles M does not occur; or the like.

The apparatus for manufacturing a printed matter according to the present exemplary embodiment is not limited to a sheet-fed apparatus. The apparatus for manufacturing a printed matter according to the present exemplary embodiment may be an apparatus in which a long recording medium is subjected to an arrangement step and a crimping step so that a long crimped printed matter is formed, and then the long crimped printed matter is cut in a predetermined size.

The apparatus for manufacturing a printed matter according to the present exemplary embodiment may further include a color image forming unit for forming a color image on a recording medium by using a coloring material. Examples of the color image forming unit include a unit that forms a color ink image on a recording medium by an inkjet method using color ink as a coloring material, a unit that forms a color image on a recording medium by an electrophotographic method using a color electrostatic charge image developer, or the like.

With the manufacturing apparatus having the above configuration, a manufacturing method is performed which is the method for manufacturing a printed matter according to the present exemplary embodiment and further includes a color image forming step of forming a color image on a recording medium by using a coloring material. Examples of the color image forming step include a step of forming a color ink image on a recording medium by an inkjet method using color ink as a coloring material, a step of forming a color image on a recording medium by an electrophotographic method using a color electrostatic charge image developer, and the like.

Figure 2:
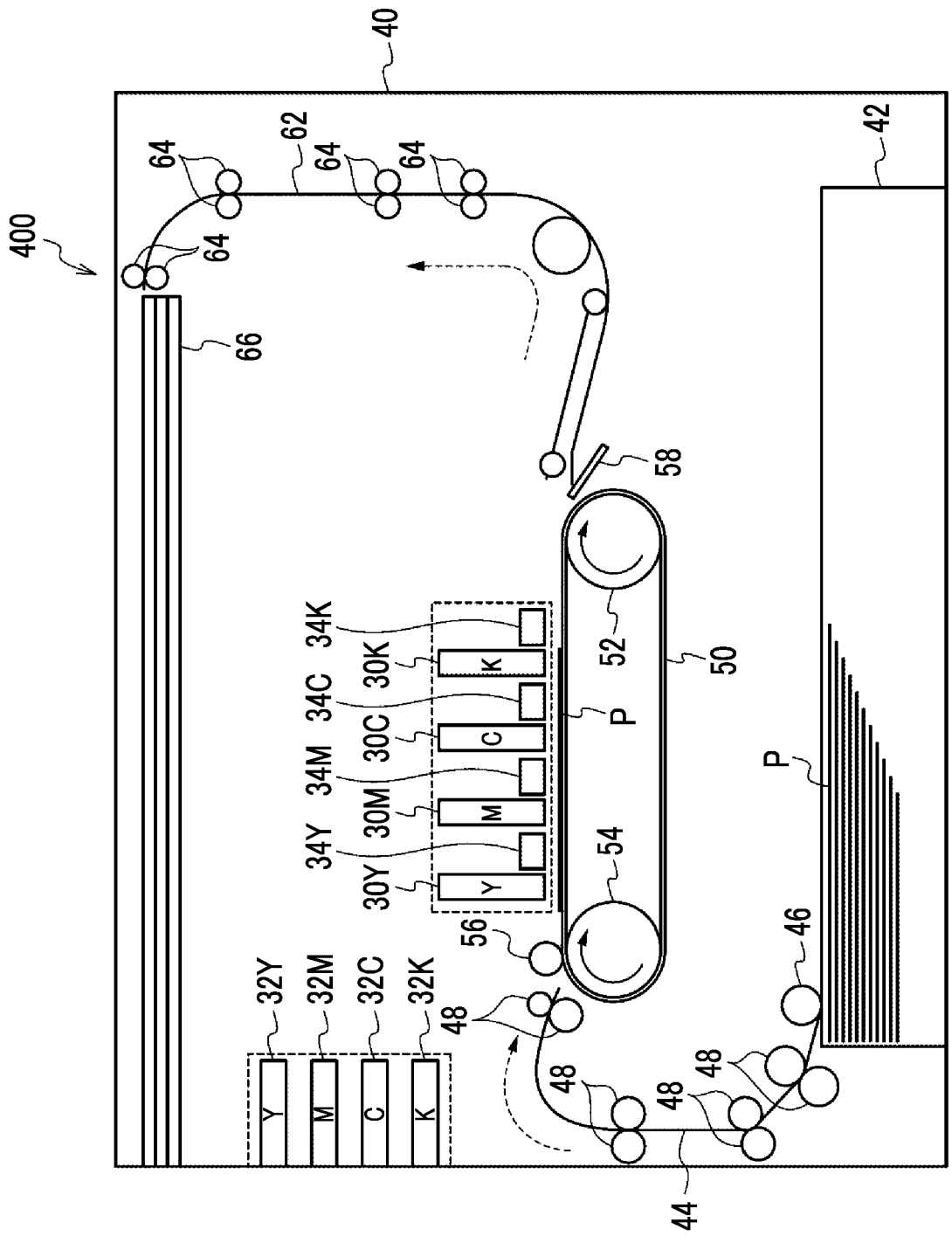
FIG. 2 is a schematic view of an inkjet recording apparatus which is an example of a color image forming unit.

As the color image forming unit, a color image forming unit for an inkjet method will be described with reference to drawings. FIG. 2 shows an inkjet recording apparatus 400 which is an example of an exemplary embodiment of the inkjet method. An inkjet recording apparatus 400 is disposed, for example, on the upstream of the arrangement unit 100 in the apparatus for manufacturing a printed matter shown in FIG. 1.

The inkjet recording apparatus 400 includes a container 42 that accommodates the recording medium P on which an image has not yet been formed, an endless transport belt 50 looped around a driving roll 52 and a driven roll 54, inkjet heads 30Y, 30M, 30C, and 30K (sometimes collectively called inkjet head 30), drying units 34Y, 34M, 34C, and 34K (sometimes collectively called drying unit 34), and a container 66 that accommodates the recording medium P on which an image has been formed, which are housed in a housing 40.

Between the container 42 and the transport belt 50, there is a transport path 44 through which the recording medium P on which an image has not yet been formed is transported. A roll 46 for taking the recording medium P out of the container 42 one by one and a plurality of roll pairs 48 for transporting the recording medium P are arranged in the transport path 44. A charging roll 56 is disposed on the upstream side of the transport belt 50. The charging roll 56 is driven in a state of sandwiching the transport belt 50 and the recording medium P with the driven roll 54, make a potential difference with the grounded driven roll 54, and charges the recording medium P so that the recording medium. P is electrostatically adsorbed onto the transport belt 50.

The inkjet head 30 is disposed above the transport belt 50 so as to face the flat portion of the transport belt 50. The region where the inkjet head 30 and the transport belt 50 face each other is a region to which ink droplets are jetted from the inkjet head 30.

The inkjet head 30Y is a head for recording a yellow (Y) image, the inkjet head 30M is a head for recording a magenta (M) image, the inkjet head 30C is a head for recording a cyan (C) image, and the inkjet head 30K is a head for recording a black (K) image. The inkjet heads 30Y, 30M, 30C, and 30K are arranged in this order, for example, from the upstream side to the downstream side of the transport belt 50. Through supply pipes (not show in the drawing), the inkjet heads 30Y, 30M, 30C, and 30K are connected to color ink cartridges 32Y, 32M, 32C, and 32K respectively. The color ink cartridges are attached to and detached from the inkjet recording apparatus 400. From the ink cartridges, color inks are supplied to the inkjet heads.

Examples of the inkjet head 30 include a long head which has an effective recording region (region where a nozzle jetting ink is disposed) equal to or larger than the width of the recording medium P (the length of the recording medium P in a direction orthogonal to the transport direction of the recording medium P); a carriage-type short head which has an effective recording region smaller than the width of the recording medium P and jets ink while moving along the width direction of the recording medium P.

Examples of the inkjet method that the inkjet head 30 adopts include a piezo method using the oscillation pressure of a piezo element; a charge control method in which electrostatic attraction is used for jetting ink; an acoustic inkjet method in which electric signals are converted into acoustic beams and radiated to ink so that the ink is jetted using radiation pressure; a thermal inkjet method in which ink is heated so that the ink bubbles and is jetted using the generated pressure; and the like.

The inkjet head 30 is, for example, a recording head for low resolution that jets ink droplets in an amount of 10 pL or more and 15 pL or less (for example, a 600 dpi recording head) or a recording head for high resolution that jets ink droplets in an amount less than 10 pL (for example, a 1,200 dpi recording head). dpi means "dots per inch".

The inkjet recording apparatus 400 is not limited to an apparatus including four inkjet heads. The inkjet recording apparatus 400 may be in the form of a device that includes four or more inkjet heads for YMCK plus neutral colors; or in the form of a device that includes only one inkjet head and records only a monochromatic image.

On the downstream side of the inkjet head 30, drying units 34Y, 60M, 60C, and 60K for the respective color inkjet heads are arranged above the transport belt 50. Examples of the drying unit 34 include a contact-type heating unit and a warm air blowing unit. The inkjet recording apparatus 400 is not limited to the device including drying units for the respective color inkjet heads, and may be in the form of a device including only one drying unit on the downstream side of the lowermost inkjet head.

A peeling board 58 facing the driving roll 52 is disposed on the downstream side of the drying unit 34. The peeling board 58 peels the recording medium P from the transport belt 50.

Between the transport belt 50 and the container 66, there is a transport path 62 through which the recording medium P on which an image has been formed is transported. A plurality of roll pairs 64 for transporting the recording medium P is arranged in the transport path 62.

The operation of the inkjet recording apparatus 400 will be described.

The recording medium P on which an image has not yet been formed is taken out of the container 42 one by one by the roll 46, and is transported to the transport belt 50 by a plurality of roll pairs 48. Then, the recording medium P is electrostatically adsorbed onto the transport belt 50 by the charging roll 56, and transported to an area below the inkjet head 30 by the rotation of the transport belt 50. Thereafter, ink is jetted to the recording medium P from the inkjet head 30 so that an image is recorded. The ink on the recording medium P is then dried by the drying unit 34. Subsequently, the recording medium P on which the ink is dried and fixed as an image is peeled from the transport belt 50 by the peeling board 58 and transported to the container 66 by the plurality of roll pairs 64.

Sheet for Manufacturing Printed Matter and Method for Manufacturing Sheet for Manufacturing Printed Matter The sheet for manufacturing a printed matter according to the present exemplary embodiment has a substrate and pressure-responsive particles arranged on the substrate. The sheet for manufacturing a printed matter according to the present exemplary embodiment is manufactured using the pressure-responsive particles according to the present exemplary embodiment. The pressure-responsive particles on the substrate may or may not retain the shape of the particles that have not yet been arranged on the substrate.

The sheet for manufacturing a printed matter according to the present exemplary embodiment is applied, for example, to a masking sheet that is stacked on and adheres to a recording medium in a case where it is necessary to hide the information recorded on the recording medium; a release sheet that is used for providing an adhesive layer on recording media in a case where the recording media are stacked and adhere to each other; and the like.

Examples of the substrate used in the sheet for manufacturing a printed matter according to the present exemplary embodiment include paper, coated paper with surface coated with a resin or the like, fabric, non-woven fabric, a resin film, a resin sheet, and the like. The substrate may have an image formed on one surface or both surfaces thereof.

In the sheet for manufacturing a printed matter according to the present exemplary embodiment, the pressure-responsive particles may be arranged on the entire surface of the substrate or on a part of the substrate. The pressure-responsive particles are arranged in one or more layers on the substrate. The layer of the pressure-responsive particles may be a continuous layer that extends in the plane direction of the substrate or a discontinuous layer extends in the plane direction of the substrate. The layer of the pressure-responsive particles may be a layer in which the pressure-responsive particles are arranged as they are, or may be a layer in which adjacent pressure-responsive particles are arranged in a fused state.

On the substrate, the amount of the pressure-responsive particles in a region in which the particles are arranged is, for example, 0.5 $g/m^2$ or more and 50 $g/m^2$ or less, 1 $g/m^2$ or more and 40 $g/m^2$ or less, or 1.5 $g/m^2$ or more and 30 $g/m^2$ or less. The thickness of the layer of the pressure-responsive particles on the substrate is, for example, 0.2 μm or greater and 25 μm or less, 0.4 μm or greater and 20 μm or less, or 0.6 μm or greater and 15 μm or less.

The sheet for manufacturing a printed matter according to the present exemplary embodiment is manufactured, for example, by a manufacturing method including an arrangement step of using the pressure-responsive particles according to the present exemplary embodiment and arranging the pressure-responsive particles on a substrate.

The arrangement step may include, for example, a step of applying the pressure-responsive particles on a substrate, and a step of fixing the pressure-responsive particles applied on the substrate to the substrate.

The application step is performed by application methods such as a spray method, a bar coating method, a die coating method, a knife coating method, a roll coating method, a reverse roll coating method, a gravure coating method, a screen printing method, an inkjet method, and a laminating method, and an electrophotographic method. A liquid composition appropriate for the application method of the application step may be prepared by dispersing the pressure-responsive particles in a dispersion medium, and used in the application step.

The fixing step is, for example, a heating step of heating the pressure-responsive particles on the substrate with a heat source so that the pressure-responsive particles are fixed onto the substrate; a pressing step of pressing the substrate, to which the pressure-responsive particles are applied, with a pair of pressing members (roll/roll or belt/roll) so that the pressure-responsive particles are fixed onto the substrate; a pressing and heating step of pressing and heating the substrate, to which the pressure-responsive particles are applied, with a pair of pressing members (rolls/roll or belt/roll) each having an internal heat source so that the pressure-responsive particles are fixed onto the substrate; or the like.

Manufacturing Printed Matter by Electrophotographic Method

An example of an embodiment in which the pressure-responsive particles according to the present exemplary embodiment are used in the electrophotographic method will be described. In electrophotographic method, the pressure-responsive particles are used as an electrostatic charge image developing toner (simply called "toner" as well).

Electrostatic Charge Image Developer

The electrostatic charge image developer (simply called "developer" as well) according to the present exemplary embodiment contains at least the pressure-responsive particles according to the present exemplary embodiment. The electrostatic charge image developer according to the present exemplary embodiment may be a one-component developer which contains only the pressure-responsive particles according to the present exemplary embodiment or a two-component developer which is obtained by mixing together the pressure-responsive particles according to the present exemplary embodiment and a carrier.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing magnetic powder in a matrix resin and mixing the powder and the resin together; a resin impregnation-type carrier obtained by impregnating porous magnetic powder with a resin; and the like. Each of the magnetic powder dispersion-type carrier and the resin impregnation-type carrier may be a carrier obtained by coating the surface of a core material, which is particles configuring the carrier, with a resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like. The coating resin and the matrix resin may contain other additives such as conductive particles. Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a resin, for example, by a coating method using a solution for forming a coating layer obtained by dissolving the coating resin and various additives (used as necessary) in an appropriate solvent, and the like. The solvent is not particularly limited, and may be selected in consideration of the type of the resin used, coating suitability, and the like.

Specifically, examples of the resin coating method include a dipping method of dipping the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and then removing solvents; and the like.

The mixing ratio (mass ratio) between the pressure-responsive particles and the carrier, represented by pressure-responsive particles: carrier, in the two-component developer is, for example, preferably 1:100 to 30:100, and more preferably 3:100 to 20:100.

Apparatus for manufacturing printed matter and method for manufacturing printed matter The apparatus for manufacturing a printed matter used for an electrophotographic method includes an arrangement unit that accommodates a developer containing the pressure-responsive particles according to the present exemplary embodiment and arranges the pressure-responsive particles on a recording medium by an electrophotographic method, and a crimping unit that folds and crimps the recording medium or stacks and crimps the recording medium and another recording medium together.

By the apparatus for manufacturing a printed matter according to the present exemplary embodiment, the method for manufacturing a printed matter by an electrophotographic method is performed. The method for manufacturing a printed matter according to the present exemplary embodiment includes an arrangement step of arranging the pressure-responsive particles on a recording medium by an electrophotographic method by using a developer containing the pressure-responsive particles according to the present exemplary embodiment and a crimping step of folding and crimping the recording medium or stacking and crimping the recording medium and another recording medium together.

The arrangement unit included in the apparatus for manufacturing a printed matter according to the present exemplary embodiment includes, for example, a photoreceptor, a charging unit that charges the surface of the photoreceptor, an electrostatic charge image forming unit that forms an electrostatic charge image on the surface of the charged photoreceptor, a developing unit that accommodates the electrostatic charge image developer according to the present exemplary embodiment and develops the electrostatic charge image formed on the surface of the photoreceptor as a pressure-responsive particle-applied portion by using the electrostatic charge image developer, and a transfer unit that transfers the pressure-responsive particle-applied portion formed on the surface of the photoreceptor to the surface of a recording medium.

It is preferable that the arrangement unit further include, for example, a fixing unit that fixes the pressure-responsive particle-applied portion transferred to the surface of the recording medium.

The arrangement step included in the method for manufacturing a printed matter according to the present exemplary embodiment includes, for example, a charging step of charging the surface of a photoreceptor, an electrostatic charge image forming step of forming an electrostatic charge image on the surface of the charged photoreceptor, a developing step of developing the electrostatic charge image formed on the surface of the photoreceptor as a pressure-responsive particle-applied portion by using the electrostatic charge image developer according to the present exemplary embodiment, and a transfer step of transferring the pressure-responsive particle-applied portion formed on the surface of the photoreceptor to the surface of a recording medium.

It is preferable that the arrangement step further include, for example, a fixing step of fixing the pressure-responsive particle-applied portion transferred to the surface of the recording medium.

The arrangement unit is, for example, a direct transfer-type device that directly transfers the pressure-responsive particle-applied portion formed on the surface of the photoreceptor to a recording medium; an intermediate transfer-type device that performs primary transfer to transfer the pressure-responsive particle-applied portion formed on the surface of the photoreceptor to the surface of an intermediate transfer member and secondary transfer to transfer the pressure-responsive particle-applied portion transferred to the surface of the intermediate transfer member to the surface of a recording medium; a device including a cleaning unit that cleans the surface of the photoreceptor not yet being charged after the transfer of the pressure-responsive particle-applied portion; a device including an electricity removing unit that removes electricity by irradiating the surface of the photoreceptor with electricity removing light before the photoreceptor is charged after the transfer of the pressure-responsive particle-applied portion; or the like. In a case where the arrangement unit is an intermediate transfer-type device, this device has, for example, a transfer unit including an intermediate transfer member with surface on which the pressure-responsive particle-applied portion will be transferred, a primary transfer unit that performs primary transfer to transfer the pressure-responsive particle-applied portion formed on the surface of the photoreceptor to the surface of the intermediate transfer member, and a secondary transfer unit that performs secondary transfer to transfer the pressure-responsive particle-applied portion transferred to the surface of the intermediate transfer member to the surface of a recording medium.

The arrangement unit may have a cartridge structure (so-called process cartridge) in which a portion including the developing unit is attached to and detached from the arrangement unit. As the process cartridge, for example, a process cartridge is used which accommodates the electrostatic charge image developer according to the present exemplary embodiment and includes a developing unit.

The crimping unit included in the apparatus for manufacturing a printed matter according to the present exemplary embodiment applies pressure to the recording medium on which the pressure-responsive particles according to the present exemplary embodiment are arranged. As a result, on the recording medium, the pressure-responsive particles according to the present exemplary embodiment are fluidized and exhibit adhesiveness. The pressure that the crimping unit applies to the recording medium so that the pressure-responsive particles according to the present exemplary embodiment are fluidized is, for example, preferably 3 MPa or higher and 300 MPa or lower, more preferably 10 MPa or higher and 200 MPa or lower, and even more preferably 30 MPa or higher and 150 MPa or lower.

The pressure-responsive particles according to the present exemplary embodiment may be arranged on the entire surface of a recording medium or on a part of a recording medium. The pressure-responsive particles according to the present exemplary embodiment are arranged in one or more layers on a recording medium. The layer of the pressure-responsive particles according to the present exemplary embodiment may be a continuous layer that extends in the plane direction of a recording medium or a discontinuous layer that extends in the plane direction of a recording medium. The layer of the pressure-responsive particles according to the present exemplary embodiment may be a layer in which the pressure-responsive particles are arranged as they are, or may be a layer in which adjacent pressure-responsive particles are arranged in a fused state.

On the recording medium, the amount of the pressure-responsive particles (for example, preferably transparent pressure-responsive particles) according to the present exemplary embodiment in a region where the particles are arranged is, for example, 0.5 g/m$^2$ or more and 50 g/m$^2$ or less, 1 g/m$^2$ or more and 40 g/m$^2$ or less, or 1.5 g/m$^2$ or more and 30 g/m$^2$ or less. The thickness of the layer of pressure-responsive particles (for example, preferably transparent pressure-responsive particles) according to the present exemplary embodiment on a recording medium is, for example, 0.2 μm or greater and 25 μm or less, 0.4 μm or greater and 20 μm or less, or 0.6 μm or greater and 15 μm or less.

Examples of the recording medium used in the apparatus for manufacturing a printed matter according to the present exemplary embodiment include paper, coated paper with surface coated with a resin or the like, fabric, non-woven fabric, a resin film, a resin sheet, and the like. The recording medium may have an image on one surface or both surfaces thereof.

An example of the apparatus for manufacturing a printed matter according to the present exemplary embodiment using an electrophotographic method will be shown below, but the present exemplary embodiment is not limited thereto.

Figure 3:
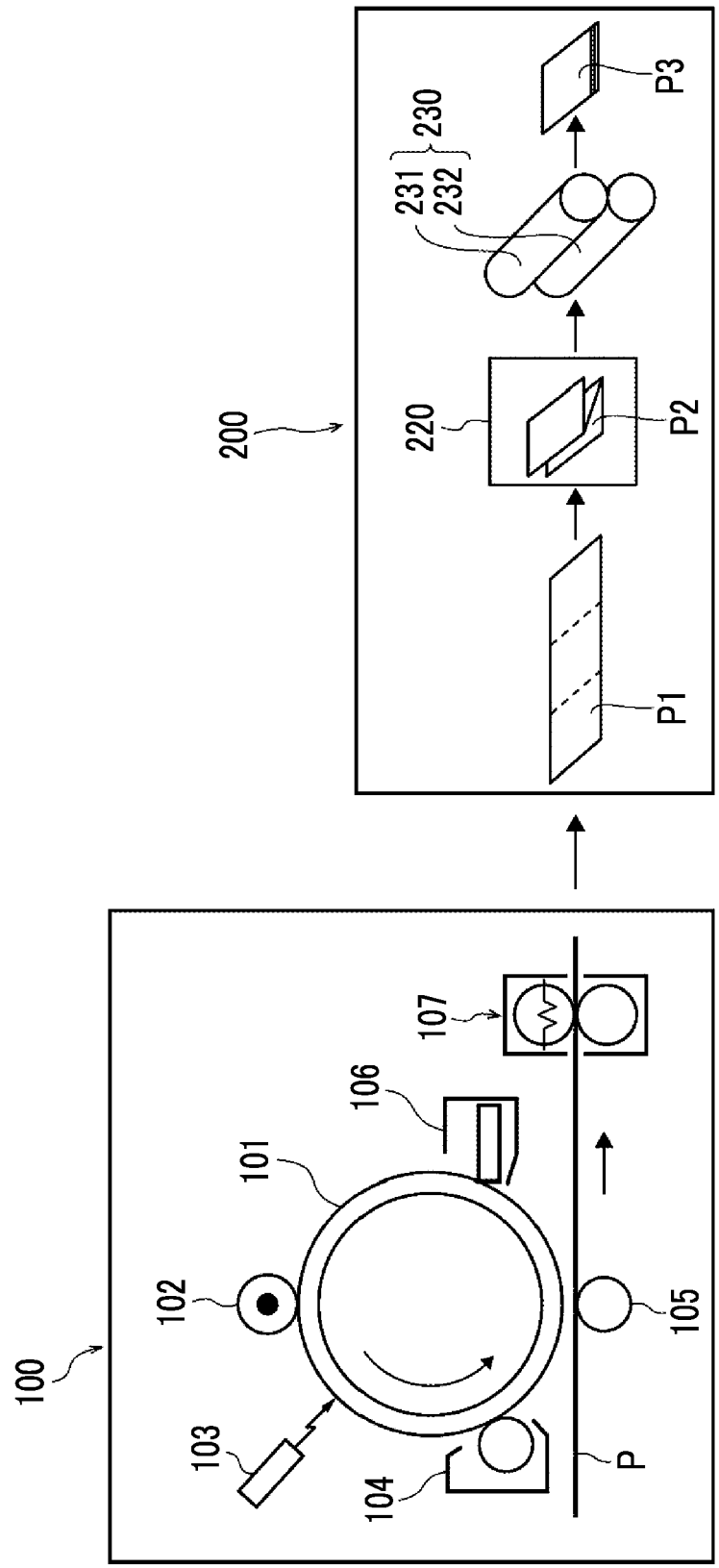
FIG. 3 is a schematic view showing another example of the apparatus for manufacturing a printed matter according to the present exemplary embodiment.

FIG. 3 is a schematic block diagram showing an example of the apparatus for manufacturing a printed matter according to the present exemplary embodiment. The apparatus for manufacturing a printed matter shown in FIG. 3 includes an arrangement unit 100 and a crimping unit 200 disposed on the downstream of the arrangement unit 100. The arrow shows the rotation direction of a photoreceptor or the transport direction of a recording medium.

The arrangement unit 100 is a direct transfer-type device that uses a developer containing the pressure-responsive particles according to the present exemplary embodiment and arranges the pressure-responsive particles according to the present exemplary embodiment on a recording medium P by an electrophotographic method. The recording medium P has an image formed in advance on one surface or both surfaces of the medium.

The arrangement unit 100 has a photoreceptor 101. Around the photoreceptor 101, a charging roll 102 (an example of charging unit) that charges the surface of the photoreceptor 101, an exposure device 103 (an example of electrostatic charge image forming unit) that exposes the surface of the charged photoreceptor 101 to a laser beam so as to form an electrostatic charge image, a developing device 104 (an example of developing unit) that develops the electrostatic charge image by supplying pressure-responsive particles to the electrostatic charge image, a transfer roll 105 (an example of transfer unit) that transfers the developed pressure-responsive particle-applied portion onto the recording medium P, and a photoreceptor cleaning device 106 (an example of cleaning unit) that removes the pressure-responsive particles remaining on the surface of the photoreceptor 101 after transfer are arranged in this order.

The way the arrangement unit 100 operates to arrange the pressure-responsive particles according to the present exemplary embodiment on the recording medium P will be described.

First, the surface of the photoreceptor 101 is charged by the charging roll 102. The exposure device 103 irradiates the surface of the charged photoreceptor 101 with a laser beam according to image data sent from a control portion not shown in the drawing. As a result, an electrostatic charge image of the arrangement pattern of the pressure-responsive particles according to the present exemplary embodiment is formed on the surface of the photoreceptor 101.

As the photoreceptor 101 runs, the electrostatic charge image formed on the photoreceptor 101 rotates to a developing position. At the developing position, the electrostatic charge image on the photoreceptor 101 is developed by the developing device 104 and turns into a pressure-responsive particle-applied portion.

The developing device 104 accommodates a developer containing at least the pressure-responsive particles according to the present exemplary embodiment and a carrier. The pressure-responsive particles according to the present exemplary embodiment are triboelectrified by being agitated together with the carrier in the developing device 104, and are held on a developer roll. As the surface of the photoreceptor 101 passes through the developing device 104, the pressure-responsive particles are electrostatically attached to the electrostatic charge image on the surface of the photoreceptor 101, and the electrostatic charge image is developed by the pressure-responsive particles. The photoreceptor 101 on which the pressure-responsive particle-applied portion is formed keeps running, and thus the pressure-responsive particle-applied portion on the photoreceptor 101 is transported to a transfer position.

In a case where the pressure-responsive particle-applied portion on the photoreceptor 101 is transported to the transfer position, transfer bias is applied to a transfer roll 105, and the electrostatic force directed to the transfer roll 105 from the photoreceptor 101 acts on the pressure-responsive particle-applied portion. As a result, the pressure-responsive particle-applied portion on the photoreceptor 101 is transferred onto the recording medium P.

The pressure-responsive particles remaining on the photoreceptor 101 are removed by a photoreceptor cleaning device 106 and collected. The photoreceptor cleaning device 106 is, for example, a cleaning blade, a cleaning brush, or the like. From the viewpoint of suppressing the phenomenon that the pressure-responsive particles according to the present exemplary embodiment remaining on the surface of the photoreceptor are fluidized by pressure and attached to the surface of the photoreceptor in the form of a film, the photoreceptor cleaning device 106 is, for example, preferably a cleaning brush.

The recording medium P to which the pressure-responsive particle-applied portion is transferred is transported to a fixing device 107 (an example of fixing unit). The fixing device 107 is, for example, a pair of fixing members (roll/roll or belt/roll). The arrangement unit 100 may not include the fixing device 107. However, from the viewpoint of inhibiting the pressure-responsive particles according to the present exemplary embodiment from falling off the recording medium P, it is preferable that the arrangement unit 100 include the fixing device 107, for example. The pressure applied to the recording medium P by the fixing device 107 may be lower than the pressure applied to the recording medium P2 by the pressing device 230. Specifically, the pressure applied to the recording medium P by the fixing device 107 is, for example, preferably 0.2 MPa or higher and 1 MPa or lower.

The fixing device 107 may or may not have an internal heat source (for example, a halogen heater) for heating the recording medium P. In a case where the fixing device 107 has an internal heat source, the surface temperature of the recording medium P heated by the heat source is, for example, preferably 150° C. or higher and 220° C. or lower, more preferably 155° C. or higher and 210° C. or lower, and even more preferably 160° C. or higher and 200° C. or lower. Even though the fixing device 107 does not have an internal heat source, the internal temperature of the fixing device 107 may be increased to a temperature equal to or higher than the environmental temperature by heat generated by a motor or the like included in the arrangement unit 100.

By passing through the arrangement unit 100, the recording medium P turns into a recording medium P1 having the pressure-responsive particles according to the present exemplary embodiment applied onto the image. The recording medium P1 is transported to the crimping unit 200.

In the apparatus for manufacturing a printed matter according to the present exemplary embodiment, the arrangement unit 100 and the crimping unit 200 may be close to each other or separated from each other. In a case where the arrangement unit 100 and the crimping unit 200 are separated from each other, the arrangement unit 100 and the crimping unit 200 are connected to each other, for example, through a transport unit (for example, a belt conveyor) that transports the recording medium P1.

The crimping unit 200 is a unit that includes a folding device 220 and the pressing device 230, and folds and crimps the recording medium P1.

The folding device 220 folds the recording medium P1 passing through the device so as to prepare a folded recording medium P2. The recording medium P2 may be folded in half, thirds, or quarters, for example. Furthermore, only a part of the recording medium P2 may be folded. The pressure-responsive particles according to the present exemplary embodiment are arranged on at least a part of at least one of two facing surfaces of the recording medium P2.

The folding device 220 may have a pair of pressing members (for example, roll/roll or belt/roll) that applies pressure to the recording medium P2. The pressure applied to the recording medium P2 by the pressing member of the folding device 220 may be lower than the pressure applied to the recording medium P2 by the pressing device 230. Specifically, the pressure applied to the recording medium P2 by the pressing member of the folding device 220 is, for example, preferably 1 MPa or higher and 10 MPa or lower.

The crimping unit 200 may include, instead of the folding device 220, a stacking device that stacks the recording medium P1 and another recording medium together. The recording medium P1 and another recording medium are stacked together, for example, in a manner in which one sheet of another recording medium is stacked on the recording medium P1, a manner in which one sheet of another recording medium is stacked on a plurality of sites within the recording medium P1, and the like. The aforementioned another recording medium may be a recording medium having an image formed in advance on one surface or both surfaces thereof, a recording medium with no image, or a crimped printed matter prepared in advance.

The recording medium P2 having passed through the folding device 220 (or the stacking device) is transported to the pressing device 230.

The pressing device 230 includes a pair of pressing members (that is, pressing rolls 231 and 232). The outer peripheral surfaces of the pressing roll 231 and the pressing roll 232 are in contact with each other so that the pressing rolls are pressed against each other. In this way, the pressing rolls apply pressure to the passing recording medium P2. The pair of pressing members included in the pressing device 230 is not limited to the combination of pressing rolls, and may be a combination of a pressing roll and a pressing belt or a combination of pressing belts.

In a case where pressure is applied to the recording medium P2 passing through the pressing device 230, the pressure-responsive particles according to the present exemplary embodiment on the recording medium P2 are fluidized by the pressure and exhibit adhesiveness. The pressure applied to the recording medium P2 by the pressing device 230 is, for example, preferably 3 MPa or higher and 300 MPa or lower, more preferably 10 MPa or higher and 200 MPa or lower, and even more preferably 30 MPa or higher and 150 MPa or lower.

The pressing device 230 may or may not have an internal heat source (for example, a halogen heater) for heating the recording medium P2. In a case where the pressing device 230 has an internal heat source, the surface temperature of the recording medium P2 heated by the heat source is, for example, preferably 30° C. or higher and 120° C. or lower, more preferably 40° C. or higher and 100° C. or lower, and even more preferably 50° C. or higher and 90° C. or lower. Even though the pressing device 230 does not have an internal heat source, the internal temperature of the pressing device 230 may be increased to a temperature equal to or higher than the environmental temperature by heat generated by a motor or the like included in the pressing device 230.

The recording medium P2 passes through the pressing device 230. As a result, the folded surfaces adhere to each other by the fluidized pressure-responsive particles according to the present exemplary embodiment, and a crimped printed matter P3 is prepared. Facing surfaces of the crimped printed matter P3 partially or totally adhere to each other.

The completed crimped printed matter P3 is transported out of the pressing device 230.

A first form of the crimped printed matter P3 is a crimped printed matter including a folded recording medium in which the facing surfaces of the medium have adhered to each other by the pressure-responsive particles according to the present exemplary embodiment. The crimped printed matter P3 in this form is manufactured by the apparatus for manufacturing a printed matter including the folding device 220.

A second form of the crimped printed matter P3 is a crimped printed matter including a plurality of stacked recording media in which the facing surfaces of the media have adhered to each other by the pressure-responsive particles according to the present exemplary embodiment. The crimped printed matter P3 in this form is manufactured by the apparatus for manufacturing a crimped printed matter including a stacking device.

The apparatus for manufacturing a printed matter according to the present exemplary embodiment is not limited to the apparatus in which the recording medium P2 is continuously transported to the pressing device 230 from the folding device 220 (or the stacking device). The apparatus for manufacturing a printed matter according to the present exemplary embodiment may be a device in which the recording medium P2 transported out of the folding device 220 (or the stacking device) is kept until the amount of the kept recording medium P2 reached a predetermined amount and then transported to the pressing device 230.

In the apparatus for manufacturing a printed matter according to the present exemplary embodiment, the folding device 220 (or the stacking device) and a crimping and pressing device 230 may be close to each other or separated from each other. In a case where the folding device 220 (or the stacking device) and the crimping and pressing device 230 are separated from each other, the folding device 220 (or the stacking device) and the crimping and pressing device 230 are connected to each other, for example, through a transport unit (for example, a belt conveyor) that transports the recording medium P2.

The apparatus for manufacturing a printed matter according to the present exemplary embodiment may include a cutting unit that cuts the recording medium in a predetermined size. The cutting unit is, for example, a cutting unit that is disposed between the arrangement unit 100 and the crimping unit 200 and cuts off a region which is a part of the recording medium P1 and in which no pressure-responsive particles according to the present exemplary embodiment are arranged; a cutting unit that is disposed between the folding device 220 and the pressing device 230 and cuts of a region which is a part of the recording medium P2 and in which no pressure-responsive particles according to the present exemplary embodiment are arranged; a cutting unit that is disposed on the downstream of the crimping unit 200 and cuts off a region which is a part of the crimped printed matter P3 and in which adhesion by the pressure-responsive particles according to the present exemplary embodiment does not occur; or the like.

The apparatus for manufacturing a printed matter according to the present exemplary embodiment is not limited to a sheet-fed apparatus. The apparatus for manufacturing a printed matter according to the present exemplary embodiment may be an apparatus in which a long recording medium is subjected to an arrangement step and a crimping step so that a long crimped printed matter is formed, and then the long crimped printed matter is cut in a predetermined size.

The apparatus for manufacturing a printed matter according to the present exemplary embodiment may further include a color image forming unit for forming a color image on a recording medium by an electrophotographic method using a color electrostatic charge image developer. The color image forming unit includes, for example, a photoreceptor, a charging unit that charges the surface of the photoreceptor, an electrostatic charge image forming unit that forms an electrostatic charge image on the surface of the charged photoreceptor, a developing unit that accommodates the color electrostatic charge image developer and develops the electrostatic charge image formed on the surface of the photoreceptor as a color toner image by using the color electrostatic charge image developer, a transfer unit that transfers the color toner image formed on the surface of the photoreceptor to the surface of a recording medium, and a thermal fixing unit that thermally fixes the color toner image transferred to the surface of the recording medium.

With the manufacturing apparatus having the above configuration, a manufacturing method is performed which is the method for manufacturing a printed matter according to the present exemplary embodiment and further includes a color image forming step of forming a color image on a recording medium by an electrophotographic method using a color electrostatic charge image developer. Specifically, the color image forming step includes a charging step of charging the surface of a photoreceptor, an electrostatic charge image forming step of forming an electrostatic charge image on the surface of the charged photoreceptor, a developing step of developing the electrostatic charge image formed on the surface of the photoreceptor as a color toner image by using the color electrostatic charge image developer, a transfer step of transferring the color toner image formed on the surface of the photoreceptor to the surface of a recording medium, and a thermal fixing step of thermally fixing the color toner image transferred to the surface of the recording medium.

The color image forming unit included in the apparatus for manufacturing a printed matter according to the present exemplary embodiment is, for example, a direct transfer-type device that directly transfers the color toner image formed on the surface of the photoreceptor to a recording medium; an intermediate transfer-type device that performs primary transfer to transfer the color toner image formed on the surface of the photoreceptor to the surface of an intermediate transfer member and secondary transfer to transfer the color toner image transferred to the surface of the intermediate transfer member to the surface of a recording medium; a device including a cleaning unit that cleans the surface of the photoreceptor not yet being charged after the transfer of the color toner image; a device including an electricity removing unit that removes electricity by irradiating the surface of the photoreceptor with electricity removing light before the photoreceptor is charged after the transfer of the color toner image; or the like. In a case where the color image forming unit is an intermediate transfer-type device, this device has, for example, a transfer unit including an intermediate transfer member with surface on which the color toner image will be transferred, a primary transfer unit that performs primary transfer to transfer the color toner image formed on the surface of the photoreceptor to the surface of the intermediate transfer member, and a secondary transfer unit that performs secondary transfer to transfer the color toner image transferred to the surface of the intermediate transfer member to the surface of a recording medium.

In the apparatus for manufacturing a printed matter according to the present exemplary embodiment, in a case where the arrangement unit for the developer containing the pressure-responsive particles according to the present exemplary embodiment and the color image forming unit adopt the intermediate transfer method, the arrangement unit and the color image forming unit may share an intermediate transfer member and a secondary transfer unit.

In the apparatus for manufacturing a printed matter according to the present exemplary embodiment, the arrangement unit for the developer containing the pressure-responsive particles according to the present exemplary embodiment and the color image forming unit may share a thermal fixing unit.

An example of the apparatus for manufacturing a printed matter according to the present exemplary embodiment including a color image forming unit will be shown below, but the present exemplary embodiment is not limited thereto. Hereinafter, among the parts shown in the drawing, main parts will be described, and others will not be described.

Figure 4:
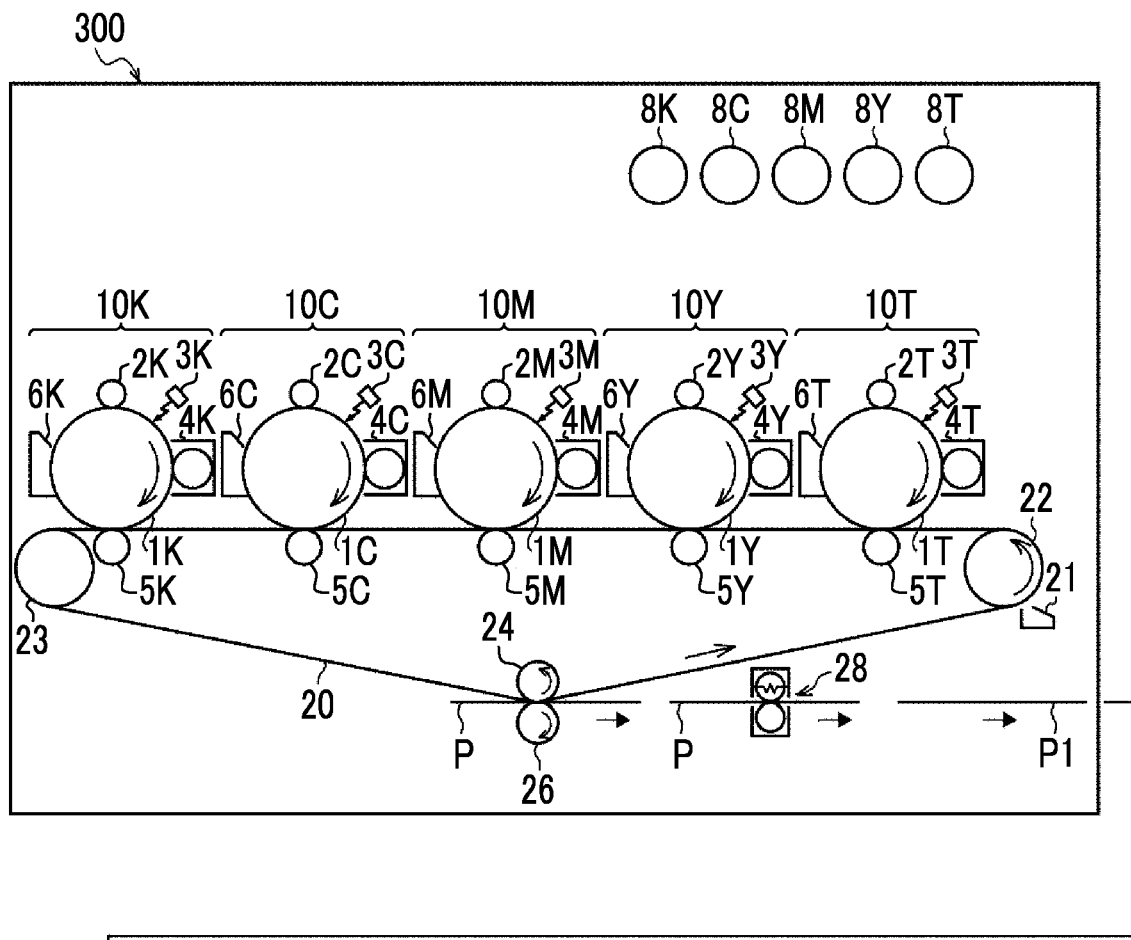
FIG. 4 is a schematic view showing another example of the apparatus for manufacturing a printed matter according to the present exemplary embodiment.
Figure 4:
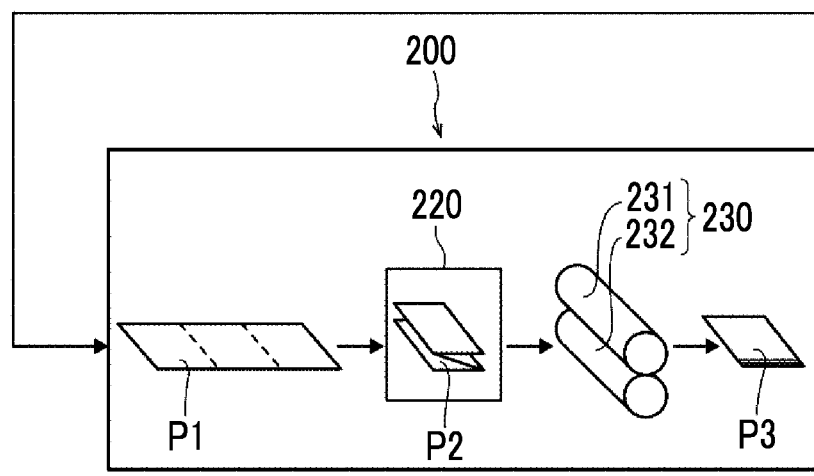

FIG. 4 is a schematic block diagram showing an example of the apparatus for manufacturing a printed matter according to the present exemplary embodiment using an electrophotographic method. The apparatus for manufacturing a printed matter shown in FIG. 4 includes a printing unit 300 that performs both the operation of arranging the pressure-responsive particles according to the present exemplary embodiment on a recording medium and operation of forming a color image, and a crimping unit 200 that is disposed on the downstream of the printing unit 300.

The printing unit 300 is an intermediate transfer-type printing unit consisting of five units arranged in tandem. The printing unit 300 includes a unit 10T for arranging pressure-responsive particles (T) according to the present exemplary embodiment and units 10Y, 10M, 10C, and 10K for forming images colored yellow (Y), magenta (M), cyan (C), and black (K) respectively. The unit 10T is an arrangement unit that arranges the pressure-responsive particles according to the present exemplary embodiment on the recording medium P by using the developer containing the pressure-responsive particles according to the present exemplary embodiment. Each of the units 10Y, 10M, 10C, and 10K is a unit for forming a color image on the recording medium P by using a developer including a color toner. The units 10T, 10Y, 10M, 10C, and 10K employ an electrophotographic method.

The units 10T, 10Y, 10M, 10C, and 10K are arranged in a line with spacings in the horizontal direction. The units 10T, 10Y, 10M, 10C, and 10K may be process cartridges attached to and detached from the printing unit 300.

An intermediate transfer belt 20 (an example of intermediate transfer member) passing the units 10T, 10Y, 10M, 10C, and 10K extends under these units. The intermediate transfer belt 20 is looped around a driving roll 22, a support roll 23, and an opposing roll 24 that are in contact with the inner surface of the intermediate transfer belt 20, and runs toward the unit 10K from the unit 10T. An intermediate transfer member cleaning device 21 facing the driving roll 22 is on the image holding surface side of the intermediate transfer belt 20.

The units 10T, 10Y, 10M, 10C, and 10K include developing devices (an example of developing unit) 4T, 4Y, 4M, 4C, and 4K, respectively. The pressure-responsive particles according to the present exemplary embodiment accommodated in a pressure-responsive particle cartridge 8T or a yellow toner, a magenta toner, a cyan toner, and a black toner accommodated in toner cartridges 8Y, 8M, 8C, and 8K are supplied to the developing devices 4T, 4Y, 4M, 4C, and 4K respectively.

The units 10T, 10Y, 10M, 10C, and 10K have the same configuration and perform the same operation. Therefore, the unit 10T for arranging the pressure-responsive particles according to the present exemplary embodiment on a recording medium will be described as a representative.

The unit 10T has a photoreceptor 1T. Around the photoreceptor 1T, a charging roll 2T (an example of charging unit) that charges the surface of the photoreceptor 1T, an exposure device 3T (an example of electrostatic charge image forming unit) that exposes the surface of the charged photoreceptor 1T to a laser beam so as to form an electrostatic charge image, a developing device 4T (an example of developing unit) that develops the electrostatic charge image by supplying pressure-responsive particles to the electrostatic charge image, a primary transfer roll 5T (an example of primary transfer unit) that transfers the developed pressure-responsive particle-applied portion onto the intermediate transfer belt 20, and a photoreceptor cleaning device 6T (an example of cleaning unit) that removes the pressure-responsive particles remaining on the surface of the photoreceptor 1T after the primary transfer are arranged in this order. The primary transfer roll 5T is disposed on the inner side of the intermediate transfer belt 20, at a position facing the photoreceptor 1T.

Hereinafter, the operation of the unit 10T will be illustrated so as to describe the operation of arranging the pressure-responsive particles according to the present exemplary embodiment on the recording medium P and forming a color image.

First, the surface of the photoreceptor 1T is charged by the charging roll 2T. The exposure device 3T irradiates the surface of the charged photoreceptor 1T with a laser beam according to image data sent from a control portion not shown in the drawing. As a result, an electrostatic charge image of the arrangement pattern of the pressure-responsive particles according to the present exemplary embodiment is formed on the surface of the photoreceptor 1T.

As the photoreceptor 1T runs, the electrostatic charge image formed on the photoreceptor 1T rotates to a developing position. At the developing position, the electrostatic charge image on the photoreceptor 1T is developed by the developing device 4T and turns into a pressure-responsive particle-applied portion.

The developing device 4T accommodates a developer containing at least the pressure-responsive particles according to the present exemplary embodiment and a carrier. The pressure-responsive particles according to the present exemplary embodiment are triboelectrified by being agitated together with the carrier in the developing device 4T, and are held on a developer roll. As the surface of the photoreceptor 1T passes through the developing device 4T, the pressure-responsive particles are electrostatically attached to the electrostatic charge image on the surface of the photoreceptor 1T, and the electrostatic charge image is developed by the pressure-responsive particles. The photoreceptor 1T on which the pressure-responsive particle-applied portion is formed keeps running, and thus the pressure-responsive particle-applied portion on the photoreceptor 1T is transported to a primary transfer position.

In a case where the pressure-responsive particle-applied portion on the photoreceptor 1T is transported to the primary transfer position, primary transfer bias is applied to a primary transfer roll 5T, and the electrostatic force directed to the primary transfer roll 5T from the photoreceptor 1T acts on the pressure-responsive particle-applied portion. As a result, the pressure-responsive particle-applied portion on the photoreceptor 1T is transferred onto the intermediate transfer belt 20. The pressure-responsive particles remaining on the photoreceptor 1T are removed by a photoreceptor cleaning device 6T and collected. The photoreceptor cleaning device 6T is, for example, a cleaning blade, a cleaning brush, or the like. The photoreceptor cleaning device 6T is preferably a cleaning brush, for example.

The units 10Y, 10M, 10C, and 10K perform the same operation as the unit 10T by using a developer including a color toner. The intermediate transfer belt 20 to which the pressure-responsive particle-applied portion is transferred by the unit 10T sequentially passes through the units 10Y, 10M, 10C, and 10K. In this process, toner images of each color are transferred in layers onto the intermediate transfer belt 20.

The intermediate transfer belt 20, to which the pressure-responsive particle-applied portion and the toner images are transferred in layers through the units 10T, 10Y, 10M, 10C, and 10K, reaches a secondary transfer portion configured with the intermediate transfer belt 20, an opposing roll 24 in contact with the inner surface of the intermediate transfer belt, and a secondary transfer roll 26 (an example of secondary transfer unit) disposed on the image holding surface side of the intermediate transfer belt 20. Meanwhile, via a supply mechanism, the recording medium P is supplied to the gap between the secondary transfer roll 26 and the intermediate transfer belt 20 that are in contact with each other. Furthermore, secondary transfer bias is applied to the opposing roll 24. At this time, the electrostatic force directed to the recording medium P from the intermediate transfer belt 20 acts on the pressure-responsive particle-applied portion and the toner images. As a result, the pressure-responsive particle-applied portion and the toner images on the intermediate transfer belt 20 are transferred onto the recording medium P.

The recording medium P, to which the pressure-responsive particle-applied portion and the toner images are transferred, is transported to a thermal fixing device 28 (an example of thermal fixing unit). The thermal fixing device 28 includes a heat source such as a halogen heater and heats the recording medium P. The surface temperature of the recording medium P heated by the thermal fixing device 28 is, for example, preferably 150° C. or higher and 220° C. or lower, more preferably 155° C. or higher and 210° C. or lower, and even more preferably 160° C. or higher and 200° C. or lower. By passing through the thermal fixing device 28, the color toner images are thermally fixed onto the recording medium P.

From the viewpoint of inhibiting the pressure-responsive particles according to the present exemplary embodiment from falling off the recording medium P and from the viewpoint of causing the color image to be more reliably fixed to the recording medium P, it is preferable that the thermal fixing device 28 be, for example, a device performing both the heating and pressing. For instance, the thermal fixing device 28 may be a pair of fixing members (roll/roll or belt/roll) having an internal heat source. In a case where the thermal fixing device 28 performs heating, the pressure applied to the recording medium P by the thermal fixing device 28 may be lower than the pressure applied to the recording medium P2 by the pressing device 230. Specifically, the pressure applied to the recording medium P by the thermal fixing device 28 is, for example, preferably 0.2 MPa or higher and 1 MPa or lower.

By passing through the printing unit 300, the recording medium P turns into the recording medium P1 to which the color image and the pressure-responsive particles according to the present exemplary embodiment are applied. The recording medium P1 is transported to the crimping unit 200.

The configuration of the crimping unit 200 in FIG. 4 may be the same as the configuration of the crimping unit 200 in FIG. 3. The configuration and operation of the crimping unit 200 will not be specifically described.

In the apparatus for manufacturing a printed matter according to the present exemplary embodiment, the printing unit 300 and the crimping unit 200 may be close to each other or separated from each other. In a case where the printing unit 300 and the crimping unit 200 are separated from each other, the printing unit 300 and the crimping unit 200 are connected to each other, for example, through a transport unit (for example, a belt conveyor) that transports the recording medium P1.

The apparatus for manufacturing a printed matter according to the present exemplary embodiment may include a cutting unit that cuts the recording medium in a predetermined size. The cutting unit is, for example, a cutting unit that is disposed between the printing unit 300 and the crimping unit 200 and cuts off a region which is a part of the recording medium P1 and in which no pressure-responsive particles according to the present exemplary embodiment are arranged; a cutting unit that is disposed between the folding device 220 and the pressing device 230 and cuts of a region which is a part of the recording medium P2 and in which no pressure-responsive particles according to the present exemplary embodiment are arranged; a cutting unit that is disposed on the downstream of the crimping unit 200 and cuts off a region which is a part of the crimped printed matter P3 and in which adhesion by the pressure-responsive particles according to the present exemplary embodiment does not occur; or the like.

The apparatus for manufacturing a printed matter according to the present exemplary embodiment is not limited to a sheet-fed apparatus. The apparatus for manufacturing a printed matter according to the present exemplary embodiment may be an apparatus in which a long recording medium is subjected to a color image forming step, an arrangement step, and a crimping step so that a long crimped printed matter is formed, and then the long crimped printed matter is cut in a predetermined size.

Process Cartridge

The process cartridge applied to the apparatus for manufacturing a printed matter for an electrophotographic method will be described.

The process cartridge according to the present exemplary embodiment includes a developing unit which accommodates the electrostatic charge image developer according to the present exemplary embodiment and develops an electrostatic charge image formed on the surface of a photoreceptor as a pressure-responsive particle-applied portion by using the electrostatic charge image developer. The process cartridge is attached to or detached from the apparatus for manufacturing a printed matter.

The process cartridge according to the present exemplary embodiment may have a configuration including a developing unit and, as necessary, at least one unit selected from a photoreceptor, a charging unit, an electrostatic charge image forming unit, a transfer unit, and the like.

Examples of exemplary embodiments of the process cartridge include a cartridge having a photoreceptor and a charging roll (an example of charging unit), a developing device (an example of developing unit), and a photoreceptor cleaning device (an example of cleaning unit) that are arranged around the photoreceptor, in which the photoreceptor, the charging roll, the developing device, and the photoreceptor cleaning device are integrated by a housing. The housing has an opening portion for exposure. The housing has mounting rails via which the process cartridge is mounted on the apparatus for manufacturing a printed matter.

Example

Hereinafter, exemplary embodiments of the invention will be specifically described based on examples. However, the exemplary embodiments of the invention are not limited to the examples. In the following description, unless otherwise specified, "parts" and "%" are based on mass.

Preparation of dispersion containing styrene-based resin particles

Preparation of Styrene-Based Resin Particle Dispersion (St1)

Styrene: 390 parts
n-Butyl acrylate: 100 parts
Acrylic acid: 10 parts
Dodecanethiol: 7.5 parts The above materials are mixed together and dissolved, thereby preparing a monomer solution.

An anionic surfactant (8 parts, Dowfax2A1 manufactured by The Dow Chemical Company) is dissolved in 205 parts of deionized water, and the above monomer solution is added thereto so that the monomers are dispersed and emulsified, thereby obtaining a emulsion.

An anionic surfactant (2.2 parts, Dowfax2A1 manufactured by The Dow Chemical Company) is dissolved in 462 parts of deionized water. The obtained solution is put in a polymerization flask equipped with an agitator, a thermometer, a reflux condenser, and a nitrogen gas introduction tube, heated to 73° C. with agitation, and kept as it is.

Ammonium persulfate (3 parts) is dissolved in 21 parts of deionized water, the obtained solution is added dropwise to the polymerization flask for 15 minutes via a metering pump, and then the aforementioned emulsion is added dropped thereto for 160 minutes via a metering pump.

Then, the polymerization flask is kept at 75° C. for 3 hours with slow agitation, and then returned to room temperature.

As a result, a styrene-based resin particle dispersion (St1) containing styrene-based resin particles is obtained. The resin particles in St1 have a volume average particle diameter (D50v) of 174 nm and a weight average molecular weight of 49,000 measured by GPC (UV detection), the glass transition temperature of St1 is 54° C., and the solid content of St1 is 42%.

The styrene-based resin particle dispersion (St1) is dried so that the styrene-based resin particles are collected. By using a differential scanning calorimeter (DSC-60A, manufactured by Shimadzu Corporation), the thermal behavior of the styrene-based resin particles at a temperature in a range of −100° C. to 100° C. is analyzed. As a result, one glass transition temperature is observed. Table 1 shows the glass transition temperature.

Preparation of Styrene-Based Resin Particle Dispersions (St2) to (St13)

Styrene-based resin particle dispersions (St2) to (St13) are prepared in the same manner as in Preparation of styrene-based resin particle dispersion (St1), except that the monomers are changed as shown in Table 1.

Table 1 shows the composition and physical properties of the styrene-based resin particle dispersion (St1) and the like. In Table 1, the monomers are described as the following abbreviations.

Styrene: St, n-butyl acrylate: BA, 2-ethylhexyl acrylate: 2EHA, ethyl acrylate: EA, 4-hydroxybutyl acrylate: 4HBA, acrylate: AA, methacrylic acid: MAA, 2-carboxyethyl acrylate: CEA

TABLE 1

| | Styrene-based resin particle dispersion | | | | | | | | | | |
|---|---|---|---|---|---|---|---|---|---|---|---|
| | Polymerization component (mass ratio) | | | | | | | | D50v of resin particles | Mw (k) | Tg |
| No. | St | BA | 2EHA | EA | 4 HBA | AA | MAA | CEA | nm | — | ° C. |
| St1 | 78 | 20 | 0 | 0 | 0 | 2 | 0 | 0 | 174 | 49 | 54 |
| St2 | 88 | 10 | 0 | 0 | 0 | 2 | 0 | 0 | 170 | 50 | 76 |
| St3 | 83 | 15 | 0 | 0 | 0 | 2 | 0 | 0 | 172 | 52 | 65 |
| St4 | 78 | 20 | 0 | 0 | 0 | 0 | 2 | 0 | 177 | 48 | 57 |

TABLE 1-continued

Styrene-based resin particle dispersion

| No. | Polymerization component (mass ratio) | | | | | | | | D50v of resin particles nm | Mw (k) | Tg °C. |
|---|---|---|---|---|---|---|---|---|---|---|---|
| | St | BA | 2EHA | EA | 4 HBA | AA | MAA | CEA | | | |
| St5 | 80 | 15 | 0 | 0 | 5 | 0 | 0 | 0 | 172 | 46 | 55 |
| St6 | 80 | 15 | 5 | 0 | 0 | 0 | 0 | 0 | 174 | 51 | 54 |
| St7 | 80 | 20 | 0 | 0 | 0 | 0 | 0 | 0 | 169 | 50 | 54 |
| St8 | 77 | 20 | 0 | 0 | 0 | 0 | 0 | 3 | 168 | 48 | 54 |
| St9 | 72 | 26 | 0 | 0 | 0 | 2 | 0 | 0 | 172 | 55 | 43 |
| St10 | 68 | 30 | 0 | 0 | 0 | 2 | 0 | 0 | 173 | 53 | 35 |
| St11 | 80 | 0 | 20 | 0 | 0 | 0 | 0 | 0 | 171 | 52 | 56 |
| St12 | 78 | 0 | 20 | 0 | 0 | 2 | 0 | 0 | 167 | 49 | 56 |
| St13 | 63 | 0 | 0 | 35 | 0 | 2 | 0 | 0 | 169 | 51 | 54 |

Preparation of Dispersion Containing Composite Resin Particles

Preparation of Composite Resin Particle Dispersion (M1)

Styrene-based resin particle dispersion (St1): 1,190 parts (solid content: 500 parts)
2-Ethylhexyl acrylate: 250 parts
n-Butyl acrylate: 250 parts
Deionized water: 982 parts The above materials are put in a polymerization flask, agitated at 25° C. for 1 hour, and then heated to 70° C.

Ammonium persulfate (2.5 parts) is dissolved in 75 parts of deionized water, and the obtained solution is added dropwise to the polymerization flask for 60 minutes via a metering pump.

Then, the polymerization flask is kept at 70° C. for 3 hours with slow agitation, and then returned to room temperature.

As a result, a composite resin particle dispersion (M1) containing composite resin particles is obtained. The resin particles in M1 have a volume average particle diameter (D50v) of 219 nm and a weight average molecular weight of 219,000 measured by GPC (UV detection), and the solid content of M1 is 32%.

The composite resin particle dispersion (M1) is dried so that the composite resin particles are collected. By using a differential scanning calorimeter (DSC-60A, manufactured by Shimadzu Corporation), the thermal behavior of the styrene-based resin particles at a temperature in a range of −150° C. to 100° C. is analyzed. As a result, two glass transition temperatures are observed. Table 2 shows the glass transition temperatures.

Preparation of Composite Resin Particle Dispersions (M2) to (M21) and (cM1) to (cM3)

Composite resin particle dispersions (M2) to (M21) and (cM1) to (cM3) are prepared in the same manner as in Preparation of composite resin particle dispersion (M1), except that the styrene-based resin particle dispersion (St1) is changed as shown in Table 2, or the polymerization components of the (meth)acrylic acid ester-based resin are changed as shown in Table 2.

Preparation of Composite Resin Particle Dispersions (M22) to (M27)

Composite resin particle dispersions (M22) to (M27) are prepared in the same manner as in Preparation of composite resin particle dispersion (M1), except that the amounts of 2-ethylhexyl acrylate and n-butyl acrylate used are adjusted.

Table 2 shows the composition and physical properties of the composite resin particle dispersion (M1) and the like. In Table 2, monomers are described as the following abbreviations.

Styrene: St, n-butyl acrylate: BA, 2-ethylhexyl acrylate: 2EHA, ethyl acrylate: EA, 4-hydroxybutyl acrylate: 4HBA, acrylate: AA, methacrylic acid: MAA, 2-carboxyethyl acrylate: CEA, hexyl acrylate: HA, propyl acrylate: PA

TABLE 2

Composite resin particle dispersion

| | St-based resin | | | | Mass ratio between | Composite resin particles (or resin particles for comparison) | | | |
|---|---|---|---|---|---|---|---|---|---|
| No. | St-based resin particle dispersion | Polymerization component | Tg °C. | Ac-based resin Polymerization component | St-based resin and Ac-based resin (St:Ac) | D50v of resin particles nm | Mw (k) | Tg °C. | Tg °C. |
| CM1 | St1 | St/BA/AA = 78/20/2 | 54 | 2EHA = 100 | 50:50 | 222 | 230 | −50 | 54 |
| CM2 | St1 | St/BA/AA = 78/20/2 | 54 | BA = 100 | 50:50 | 225 | 220 | −53 | 54 |
| CM3 | St12 | St/2EHA/AA = 78/20/2 | 56 | BA = 100 | 50:50 | 224 | 212 | −53 | 56 |
| M1 | St1 | St/BA/AA = 78/20/2 | 54 | 2EHA/BA = 50/50 | 50:50 | 219 | 219 | −52 | 54 |

TABLE 2-continued

Composite resin particle dispersion

| No. | St-based resin particle dispersion | St-based resin Polymerization component | Tg °C. | Ac-based resin Polymerization component | Mass ratio between St-based resin and Ac-based (St:Ac) resin | D50v of resin particles nm | Mw (k) | Tg °C. | Tg °C. |
|---|---|---|---|---|---|---|---|---|---|
| M2 | St2 | St/BA/AA = 88/10/2 | 76 | 2EHA/BA = 50/50 | 50:50 | 218 | 240 | −52 | 76 |
| M3 | St3 | St/BA/AA = 83/15/2 | 65 | 2EHA/BA = 50/50 | 50:50 | 220 | 231 | −52 | 65 |
| M4 | St4 | St/BA/MAA = 78/20/2 | 57 | 2EHA/BA = 50/50 | 50:50 | 221 | 250 | −52 | 57 |
| M5 | St5 | St/ BA/4HBA = 80/15/5 | 55 | 2EHA/BA = 50/50 | 50:50 | 224 | 242 | −52 | 55 |
| M6 | St6 | St/BA/2EHA = 80/15/5 | 54 | 2EHA/BA = 50/50 | 50:50 | 225 | 233 | −52 | 54 |
| M7 | St7 | St/BA = 80/20 | 54 | 2EHA/BA = 50/50 | 50:50 | 224 | 243 | −52 | 54 |
| M8 | St8 | St/BA/CEA = 77/20/3 | 54 | 2EHA/BA = 50/50 | 50:50 | 222 | 260 | −52 | 54 |
| M9 | St9 | St/BA/AA = 72/26/2 | 43 | 2EHA/BA = 50/50 | 50:50 | 223 | 251 | −52 | 43 |
| M10 | St10 | St/BA/AA = 68/30/2 | 35 | 2EHA/BA = 50/50 | 50:50 | 220 | 243 | −52 | 35 |
| M11 | St11 | St/2EHA = 80/20 | 56 | 2EHA/BA = 50/50 | 50:50 | 221 | 249 | −52 | 56 |
| M12 | St12 | St/2EHA/AA = 78/20/2 | 56 | 2EHA/BA = 50/50 | 50:50 | 227 | 237 | −52 | 56 |
| M13 | St12 | St/2EHA/AA = 78/20/2 | 56 | 2EHA/HA = 50/50 | 50:50 | 224 | 226 | −55 | 56 |
| M14 | St13 | St/EA/AA = 63/35/2 | 54 | 2EHA/PA = 50/50 | 50:50 | 224 | 243 | −45 | 54 |
| M15 | St1 | St/BA/AA = 78/20/2 | 54 | 2EHA/HA = 50/50 | 50:50 | 226 | 270 | −54 | 54 |
| M16 | St1 | St/BA/AA = 78/20/2 | 54 | 2EHA/BA = 90/10 | 50:50 | 224 | 264 | −51 | 54 |
| M17 | St1 | St/BA/AA = 78/20/2 | 54 | 2EHA/BA = 80/20 | 50:50 | 226 | 248 | −52 | 54 |
| M18 | St1 | St/BA/AA = 78/20/2 | 54 | 2EHA/BA = 70/30 | 50:50 | 226 | 260 | −52 | 54 |
| M19 | St1 | St/BA/AA = 78/20/2 | 54 | 2EHA/BA = 30/70 | 50:50 | 225 | 273 | −52 | 54 |
| M20 | St1 | St/BA/AA = 78/20/2 | 54 | 2EHA/BA = 20/80 | 50:50 | 224 | 233 | −52 | 54 |
| M21 | St1 | St/BA/AA = 78/20/2 | 54 | 2EHA/BA = 10/90 | 50:50 | 223 | 243 | −53 | 54 |
| M22 | St1 | St/BA/AA = 78/20/2 | 54 | 2EHA/BA = 50/50 | 90:10 | 182 | 180 | −52 | 54 |
| M23 | St1 | St/BA/AA = 78/20/2 | 54 | 2EHA/BA = 50/50 | 80:20 | 190 | 210 | −52 | 54 |
| M24 | St1 | St/BA/AA = 78/20/2 | 54 | 2EHA/BA = 50/50 | 70:30 | 199 | 223 | −52 | 54 |
| M25 | St1 | St/BA/AA = 78/20/2 | 54 | 2EHA/BA = 50/50 | 30:70 | 259 | 300 | −52 | 54 |
| M26 | St1 | St/BA/AA = 78/20/2 | 54 | 2EHA/BA = 50/50 | 20:80 | 300 | 320 | −52 | 54 |
| M27 | St1 | St/BA/AA = 78/20/2 | 54 | 2EHA/BA = 50/50 | 10:90 | 380 | 331 | −52 | 54 |

Preparation of Composite Resin Particle Dispersions (M28) to (M30)

Composite resin particle dispersions (M28) to (M30) containing composite resin particles having different weight average molecular weights are prepared in the same manner as in Preparation of composite resin particle dispersion (M1), except that the amount of ammonium persulfate is changed as shown in Table 3.

TABLE 3

|  | Ammonium persulfate |
|---|---|
| M28 | 3.0 parts |
| M29 | 5.0 parts |
| M30 | 7.5 parts |

Table 4 shows the composition and physical properties of the composite resin particle dispersion (M28) and the like. In Table 4, monomers are described as the following abbreviations.

Styrene: St, n-butyl acrylate: BA, acrylic acid: AA, 2-ethylhexyl acrylate: 2EHA

TABLE 4

Composite resin particles dispersion

| | St-based resin | | | | Composite resin particles | | | | |
|---|---|---|---|---|---|---|---|---|---|
| | | | | | Mass ratio between | D50v of | | | |
| | St-based resin particle | Polymerization | Tg | Ac-based resin Polymerization | St-based resin and Ac-based resin | resin particles | Mw (k) | Tg | |
| No. | dispersion | component | °C. | component | (St:Ac) | nm | — | °C. | °C. |
| M28 | St1 | St/BA/AA = 78/20/2 | 54 | 2EHA/BA = 50/50 | 50:50 | 219 | 150 | −52 | 54 |
| M29 | St1 | St/BA/AA = 78/20/2 | 54 | 2EHA/BA = 50/50 | 50:50 | 219 | 100 | −52 | 54 |
| M30 | St1 | St/BA/AA = 78/20/2 | 54 | 2EHA/BA = 50/50 | 50:50 | 219 | 60 | −52 | 54 |

Preparation of Pressure-Responsive Particles
Preparation of Pressure-Responsive Particles (1)
Composite resin particle dispersion (M1): 504 parts
Deionized water: 710 parts
Anionic surfactant (Dowfax2A1 manufactured by The Dow Chemical Company): 1 part The above materials are put in a reaction vessel equipped with a thermometer and a pH meter, add a 1.0% aqueous nitric acid solution is added thereto at a temperature of 25° C. so that the pH is adjusted to 3.0. Then, in a state where the obtained solution is being dispersed with a homogenizer (ULTRA-TURRAX T50 manufactured by IKA) at a rotation frequency of 5,000 rpm, 23 parts of a 2.0% aqueous aluminum sulfate solution is added thereto. Then, an agitator and a mantle heater are installed in the reaction vessel. The reaction vessel is heated to 40° C. at a heating rate of 0.2° C./min, and after the temperature exceeds 40° C., the reaction vessel is heated at a heating rate of 0.05° C./min. The particle diameter is measured every 10 minutes with MULTISIZER II (aperture diameter: 50 µm, manufactured by Beckman Coulter, Inc.). The reaction vessel is kept at the temperature at which the volume average particle diameter reached 5.0 µm, and 170 parts of the styrene-based resin particle dispersion (St1) is added thereto for 5 minutes. After the addition of St1 ends, the reaction vessel is kept at 50° C. for 30 minutes. Then, a 1.0% aqueous sodium hydroxide solution is added thereto so that the pH of the slurry is adjusted to 6.0. Thereafter, in a state where the pH is being adjusted to 6.0 every 5° C., the reaction vessel is heated to 90° C. at a heating rate of 1° C./min and kept at 90° C. As a result of observing the shape and surface properties of the particles with an optical microscope and a field emission scanning electron microscope (FE-SEM), the coalescence of the particles is confirmed after 10 hours. Therefore, the vessel is cooled to 30° C. for 5 minutes with cooling water.

The cooled slurry is passed through a nylon mesh with an opening size of 15 µm so that coarse particles are removed, and the slurry having passed through the mesh is filtered under reduced pressure by using an aspirator. The solids remaining on the filter paper are crushed as finely as possible by hand and added to deionized water (temperature: 30° C.) in an amount 10 times the amount of the solids, and the obtained solution is agitated for 30 minutes. Thereafter, the solution is filtered using an aspirator under reduced pressure, the solids remaining on the filter paper are crushed as finely as possible by hand and added to deionized water (temperature: 30° C.) in an amount 10 times the amount of the solids. The obtained solution is agitated for 30 minutes and then filtered again under reduced pressure by using an aspirator, and the electrical conductivity of the filtrate is measured. This operation is repeated until the electric conductivity of the filtrate becomes 10 µS/cm or lower, and the solids are washed.

The washed solids are finely crushed with a wet and dry granulation sizing machine (Comil) and vacuum-dried in an oven at 25° C. for 36 hours, thereby obtaining pressure-responsive base particles (1). The pressure-responsive base particles (1) have a number average particle diameter of 8.0 µm.

The pressure-responsive base particles (1) (100 parts) and 1.5 parts of hydrophobic silica (RY50 manufactured by Nippon Aerosil Co., Ltd.) are mixed together by using a sample mill at a rotation frequency of 13,000 rpm for 30 seconds. The mixture is sieved with a vibrating sieve having an opening size of 45 µm, thereby obtaining pressure-responsive particles (1).

The pressure-responsive particles (1) are sampled, and the thermal behavior of the samples at a temperature in a range of −150° C. to 100° C. is analyzed using a differential scanning calorimeter (DSC-60A, manufactured by Shimadzu Corporation). As a result, two glass transition temperatures are observed. Table 5 shows the glass transition temperatures.

For the pressure-responsive particles (1), the temperature T1 and the temperature T2 are determined by the measurement method described above. As a result, it has been revealed that the pressure-responsive particles (1) satisfy Formula 1 "10° C.≤T1−T2".

The cross section of the pressure-responsive particles (1) is observed with a scanning electron microscope (SEM). As a result, a sea-island structure is observed. The pressure-responsive particles (1) has a core portion in which island phases are present and a shell layer in which no island phase is present. The sea phase contains a styrene-based resin, and the island phases contain a (meth)acrylic acid ester-based resin. By the measurement method described above, the average diameter of the island phases is determined. Table 5 shows the average diameter of the island phases.

In the pressure-responsive particles (1), the liberation rate of the inorganic oxide particles is in a range of 10% by mass or higher and 40% by mass or lower.

Preparation of Pressure-Responsive Particles (2) to (27)

Pressure-responsive particles (2) to (27) are prepared in the same manner as in Preparation of pressure-responsive particles (1), except that the composite resin particle dispersion and the styrene-based resin particle dispersion are changed as shown in Table 5.

For the pressure-responsive particles (2) to (27), the temperature T1 and the temperature T2 are determined by the measurement method described above. As a result, it has been revealed that all the pressure-responsive particles (2) to (27) satisfy Formula 1 "10° C.≤T1−T2".

In the pressure-responsive particles (2) to (27), the liberation rate of the inorganic oxide particles is in a range of 10% by mass or higher and 40% by mass or lower.

Preparation of Pressure-Responsive Particles (28) to (30)

Pressure-responsive particles (28) to (30) are prepared in the same manner as in Preparation of pressure-responsive particles (1), except that the composite resin particle dispersion is changed as shown in Table 6.

For the pressure-responsive particles (28) to (30), the temperature T1 and the temperature T2 are determined by the measurement method described above. As a result, it has been revealed that all the pressure-responsive particles (28) to (30) satisfy Formula 1 "10° C.≤T1−T2".

In the pressure-responsive particles (28) to (30), the liberation rate of the inorganic oxide particles is in a range of 10% by mass or higher and 40% by mass or lower.

Preparation of Pressure-Responsive Particles (31)

Pressure-responsive base particles are prepared by the following pulverization method.

By drying the composite resin particle dispersion (M1), composite resin particles (M31) are obtained. The composite resin particles (M31) are thermally kneaded with an extruder at a set temperature of 100° C., cooled, and then pulverized and classified, thereby obtaining pressure-responsive base particles (31) having a number average particle diameter of 8.0 μm.

The pressure-responsive base particles (31) (100 parts) and 1.5 parts of hydrophobic silica (RY50 manufactured by Nippon Aerosil Co., Ltd.) are mixed together by using a sample mill at a rotation frequency of 13,000 rpm for 30 seconds. The mixture is sieved with a vibrating sieve having an opening size of 45 μm, thereby obtaining pressure-responsive particles (31).

The pressure-responsive particles (31) are sampled, and the thermal behavior of the samples at a temperature in a range of −150° C. to 100° C. is analyzed using a differential scanning calorimeter (DSC-60A, manufactured by Shimadzu Corporation). As a result, two glass transition temperatures are observed. Table 6 shows the glass transition temperatures.

For the pressure-responsive particles (31), the temperature T1 and the temperature T2 are determined by the measurement method described above. As a result, it has been revealed that the pressure-responsive particles (31) satisfy Formula 1 "10° C.≤T1−T2".

In the pressure-responsive particles (31), the liberation rate of the inorganic oxide particles is in a range of 10% by mass or higher and 40% by mass or lower.

Preparation of Pressure-Responsive Particles (c1) to (c3) for Comparison

Pressure-responsive particles (c1) to (c3) are prepared in the same manner as in Preparation of pressure-responsive particles (1), except that the composite resin particle dispersion and the styrene-based resin particle dispersion are changed as shown in Table 5.

Evaluation of Pressure-Responsive Phase Transition

The temperature difference (T1−T3), which is an index showing how readily the pressure-responsive particles undergo phase transition by pressure, is determined. The respective pressure-responsive particles are sampled, the temperature T1 and the temperature T3 of the samples are measured with a flow tester (CFT-500 manufactured by Shimadzu Corporation), and the temperature difference (T1−T3) is calculated. Tables 5 and 6 show the temperature difference (T1−T3).

Evaluation of Adhesiveness

As a recording medium, postcard paper V424 manufactured by Fuji Xerox Co., Ltd. is prepared. By using an image forming apparatus DocuCentre C7550I manufactured by Fuji Xerox Co., Ltd. and commercially available yellow toner, magenta toner, cyan toner, and black toner manufactured by Fuji Xerox Co., Ltd., an image having an area density of 30% that is a mixture of black texts and a full color photographic image is formed on and fixed to one surface of the postcard paper.

The pressure-responsive particles are scattered on the entire image forming surface of the postcard paper so that the amount of the particles applied equals 3 g/m$^2$. The postcard paper is passed through a belt roll-type fixing machine so that the pressure-responsive particles are fixed to the image forming surface of the postcard paper and that a layer of the pressure-responsive particles is formed.

By using a sealer PRESSLE multiII manufactured by TOPPAN FORMS CO., LTD., the postcard paper having the layer of pressure-responsive particles on the image forming surface is folded in half so that the image forming surface becomes the inner side. Pressure is applied to the postcard paper folded in half, so that the image forming surfaces of the inner side adhere to each other at a pressure of 90 MPa.

By using the apparatuses described above, 10 postcards are continuously prepared under the conditions described above. Each of the postcards is folded in half so that the image forming surface becomes the inner side, and the image forming surfaces are caused to adhere to each other.

The tenth postcard is cut along the length direction, thereby preparing rectangular test pieces having a width of 15 mm. The 90 degree peel test is performed on the test pieces. The peeling rate for the 90 degree peel test is set to 20 mm/min. While the test piece is being peeled 50 mm from 10 mm after the start of measurement, a load (N) is measured at an interval of 0.4 mm, and the average thereof is calculated. Furthermore, the average of loads (N) for three test pieces is calculated. The load (N) required for peeling is classified as follows. The results are shown in Tables 5 and 6.

A: 0.8N or higher

B: 0.6N or higher and lower than 0.8N

C: 0.4N or higher and lower than 0.6N

D: 0.2N or higher and lower than 0.4N

E: Lower than 0.2N

TABLE 5

| Pressure-responsive particles | Core portion | | | | Shell layer St-based resin particle dispersion |
|---|---|---|---|---|---|
| | Composite resin particle dispersion | Polymerization component of St-based resin | Polymerization component of Ac-based resin | Mass ratio between St-based resin and Ac-based resin (St:Ac) | |
| c1 | cM1 | St/BA/AA = 78/20/2 | 2EHA = 100 | 50:50 | St1 |
| c2 | cM2 | St/BA/AA = 78/20/2 | BA = 100 | 50:50 | St1 |
| c3 | cM3 | St/2EHA/AA = 78/20/2 | BA = 100 | 50:50 | St12 |
| 1 | M1 | St/BA/AA = 78/20/2 | 2EHA/BA = 50/50 | 50:50 | St1 |
| 2 | M2 | St/BA/AA = 88/10/2 | 2EHA/BA = 50/50 | 50:50 | St2 |
| 3 | M3 | St/BA/AA = 83/15/2 | 2EHA/BA = 50/50 | 50:50 | St3 |
| 4 | M4 | St/BA/MAA = 78/20/2 | 2EHA/BA = 50/50 | 50:50 | St4 |
| 5 | M5 | St/BA/4HBA = 80/15/5 | 2EHA/BA = 50/50 | 50:50 | St5 |
| 6 | M6 | St/BA/2EHA = 80/15/5 | 2EHA/BA = 50/50 | 50:50 | St6 |
| 7 | M7 | St/BA = 80/20 | 2EHA/BA = 50/50 | 50:50 | St7 |
| 8 | M8 | St/BA/CEA = 77/20/3 | 2EHA/BA = 50/50 | 50:50 | St8 |
| 9 | M9 | St/BA/AA = 72/26/2 | 2EHA/BA = 50/50 | 50:50 | St9 |
| 10 | M10 | St/BA/AA = 68/30/2 | 2EHA/BA = 50/50 | 50:50 | St10 |
| 11 | M11 | St/2EHA = 80/20 | 2EHA/BA = 50/50 | 50:50 | St11 |
| 12 | M12 | St/2EHA/AA = 78/20/2 | 2EHA/BA = 50/50 | 50:50 | St12 |
| 13 | M13 | St/2EHA/AA = 78/20/2 | 2EHA/HA = 50/50 | 50:50 | St12 |
| 14 | M14 | St/EA/AA = 63/35/2 | 2EHA/PA = 50/50 | 50:50 | St13 |
| 15 | M15 | St/BA/AA = 78/20/2 | 2EHA/HA = 50/50 | 50:50 | St1 |
| 16 | M16 | St/BA/AA = 78/20/2 | 2EHA/BA = 90/10 | 50:50 | St1 |
| 17 | M17 | St/BA/AA = 78/20/2 | 2EHA/BA = 80/20 | 50:50 | St1 |
| 18 | M18 | St/BA/AA = 78/20/2 | 2EHA/BA = 70/30 | 50:50 | St1 |
| 19 | M19 | St/BA/AA = 78/20/2 | 2EHA/BA = 30/70 | 50:50 | St1 |
| 20 | M20 | St/BA/AA = 78/20/2 | 2EHA/BA = 20/80 | 50:50 | St1 |
| 21 | M21 | St/BA/AA = 78/20/2 | 2EHA/BA = 10/90 | 50:50 | St1 |
| 22 | M22 | St/BA/AA = 78/20/2 | 2EHA/BA = 50/50 | 90:10 | St1 |
| 23 | M23 | St/BA/AA = 78/20/2 | 2EHA/BA = 50/50 | 80:20 | St1 |
| 24 | M24 | St/BA/AA = 78/20/2 | 2EHA/BA = 50/50 | 70:30 | St1 |
| 25 | M25 | St/BA/AA = 78/20/2 | 2EHA/BA = 50/50 | 30:70 | St1 |
| 26 | M26 | St/BA/AA = 78/20/2 | 2EHA/BA = 50/50 | 20:80 | St1 |
| 27 | M27 | St/BA/AA = 78/20/2 | 2EHA/BA = 50/50 | 10:90 | St1 |

TABLE 5-continued

| | | | | | | Pressure-responsive | | |
| Pressure-responsive particles | D50v μm | Average diameter of island phase nm | Tg °C. | Tg °C. | Tg difference °C. | T3 °C. | phase transition (T1 − T3) °C. | Adhesive-ness | Note |
|---|---|---|---|---|---|---|---|---|---|
| c1 | 8.0 | 600 | −50 | 54 | 104 | 95 | 3 | D | Comparative Example |
| c2 | 8.0 | 550 | −53 | 54 | 107 | 93 | 4 | D | Comparative Example |
| c3 | 11.0 | 570 | −53 | 56 | 109 | 93 | 4 | D | Comparative Example |
| 1 | 8.0 | 200 | −52 | 54 | 106 | 75 | 15 | A | Example |
| 2 | 11.0 | 250 | −52 | 76 | 128 | 70 | 13 | A | Example |
| 3 | 11.0 | 280 | −52 | 65 | 117 | 78 | 15 | A | Example |
| 4 | 11.0 | 240 | −52 | 57 | 109 | 70 | 10 | A | Example |
| 5 | 11.0 | 240 | −52 | 55 | 107 | 74 | 16 | A | Example |
| 6 | 11.0 | 250 | −52 | 54 | 106 | 73 | 14 | A | Example |
| 7 | 9.5 | 250 | −52 | 54 | 106 | 73 | 13 | A | Example |
| 8 | 9.5 | 250 | −52 | 54 | 106 | 75 | 10 | A | Example |
| 9 | 9.5 | 220 | −52 | 43 | 95 | 75 | 15 | A | Example |
| 10 | 9.5 | 230 | −52 | 35 | 87 | 73 | 15 | A | Example |
| 11 | 9.5 | 220 | −52 | 56 | 108 | 72 | 15 | A | Example |
| 12 | 9.5 | 230 | −52 | 56 | 108 | 75 | 20 | A | Example |
| 13 | 5.8 | 250 | −55 | 56 | 111 | 70 | 15 | A | Example |
| 14 | 5.8 | 350 | −45 | 54 | 99 | 80 | 5 | B | Example |
| 15 | 5.8 | 400 | −54 | 54 | 108 | 81 | 7 | B | Example |
| 16 | 8.0 | 400 | −51 | 54 | 105 | 80 | 10 | B | Example |
| 17 | 8.0 | 300 | −52 | 54 | 106 | 70 | 20 | A | Example |
| 18 | 8.0 | 250 | −52 | 54 | 106 | 75 | 15 | A | Example |
| 19 | 8.0 | 250 | −52 | 54 | 106 | 73 | 15 | A | Example |
| 20 | 8.0 | 300 | −52 | 54 | 106 | 75 | 20 | A | Example |
| 21 | 8.0 | 400 | −53 | 54 | 107 | 80 | 5 | B | Example |
| 22 | 8.0 | 450 | −52 | 54 | 106 | 85 | 5 | C | Example |
| 23 | 8.0 | 400 | −52 | 54 | 106 | 80 | 10 | B | Example |
| 24 | 8.0 | 250 | −52 | 54 | 106 | 75 | 15 | A | Example |
| 25 | 8.0 | 210 | −52 | 54 | 106 | 73 | 13 | A | Example |
| 26 | 8.0 | 230 | −52 | 54 | 106 | 72 | 13 | A | Example |
| 27 | 8.0 | 250 | −52 | 54 | 106 | 72 | 13 | A | Example |

| | | Core portion | | | |
|---|---|---|---|---|---|
| Pressure-responsive particles | Composite resin particle dispersion | Polymerization component of St-based resin | Polymerization component of Ac-based resin | Mass ratio between St-based resin and Ac-based resin (St:Ac) | Shell layer St-based resin particle dispersion |
| 28 | M28 | St/BA/AA = 78/20/2 | 2EHA/BA = 50/50 | 50:50 | St1 |
| 29 | M29 | St/BA/AA = 78/20/2 | 2EHA/BA = 50/50 | 50:50 | St1 |
| 30 | M30 | St/BA/AA = 78/20/2 | 2EHA/BA = 50/50 | 50:50 | St1 |
| 31 | M31 | St/BA/AA = 78/20/2 | 2EHA/BA = 50/50 | 50:50 | — |

| | | | | | | | Pressure-responsive | | |
| Pressure-responsive particles | D50v μm | Average diameter of island phase nm | Tg °C. | Tg °C. | Tg difference °C. | T3 °C. | phase transition (T1 − T3) °C. | Adhesiveness | Note |
|---|---|---|---|---|---|---|---|---|---|
| 28 | 8.0 | 200 | −52 | 54 | 106 | 75 | 15 | A | Example |
| 29 | 8.0 | 200 | −52 | 54 | 106 | 75 | 15 | A | Example |

| | | | | | | | | | |
|---|---|---|---|---|---|---|---|---|---|
| 30 | 8.0 | 200 | −52 | 54 | 106 | 75 | 15 | B | Example |
| 31 | 8.0 | 400 | −52 | 54 | 106 | 75 | 7 | B | Example |

The postcards prepared using the pressure-responsive particles (1) to (31) are evaluated in the same manner as in Evaluation of image loss described later. As a result, the pressure-responsive particles (1) to (31) are classified as A.

Preparation of Dispersion Containing Composite Resin Particles

Preparation of Composite Resin Particle Dispersion (M50)

Styrene-based resin particle dispersion (St1): 1,190 parts (solid content: 500 parts)
2-Ethylhexyl acrylate: 200 parts
N-Butyl acrylate: 200 parts Preparation of Composite Resin Particle Dispersions (M51) to (M55)

Composite resin particle dispersions (M51) to (M55) are prepared in the same manner as in Preparation of composite resin particles (M50), except that the materials are changed according to the specifications shown in Table 7.

Table 7 shows the composition and physical properties of the composite resin particle dispersion (M50) and the like. In Table 7, monomers are described as the following abbreviations.

Styrene: St, n-butyl acrylate: BA, acrylic acid: AA, 2-ethylhexyl acrylate: 2EHA

| | Composite resin particles dispersion | | | | | | | | |
|---|---|---|---|---|---|---|---|---|---|
| | St-based resin (1) | | | | | Composite resin particles | | | |
| No. | St-based resin particle dispersion | Polymerization component | Tg °C. | Ac-based resin Polymerization component | St-based resin (2) Polymerization component | Mass ratio between St-based resin and Ac-based resin (St:Ac) | D50v of resin particles nm | Mw (k) | Tg °C. / °C. |
| M50 | St1 | St/BA/AA = 78/20/2 | 54 | 2EHA/BA = 50/50 | St/BA = 85/15 | 60:40 | 223 | 220 | −52 / 55 |
| M51 | St1 | St/BA/AA = 78/20/2 | 54 | 2EHA/BA = 50/50 | St/BA = 90/10 | 60:40 | 224 | 215 | −52 / 55 |
| M52 | St1 | St/BA/AA = 78/20/2 | 54 | 2EHA/BA = 70/30 | St/BA = 70/30 | 60:40 | 223 | 212 | −54 / 53 |
| M53 | St1 | St/BA/AA = 78/20/2 | 54 | 2EHA/BA = 30/70 | St/BA = 90/10 | 60:40 | 223 | 200 | −52 / 54 |
| M54 | St1 | St/BA/AA = 78/20/2 | 54 | 2EHA/BA = 60/40 | St/BA = 85/15 | 50:50 | 230 | 220 | −52 / 54 |
| M55 | St3 | St/BA/AA = 83/15/2 | 65 | 2EHA/BA = 60/40 | St/BA = 85/15 | 50:50 | 228 | 223 | −52 / 65 |

Deionized water: 1,360 parts

The above materials are put in a polymerization flask, agitated at 25° C. for 1 hour, and then heated to 70° C.

Ammonium persulfate (2.5 parts) is dissolved in 75 parts of deionized water, and the obtained solution is added dropwise to the polymerization flask for 60 minutes via a metering pump.

Then, the polymerization flask is kept at 70° C. for 2 hours with slow agitation, and then a mixture of 85 parts of styrene and 15 parts of n-butyl acrylate is added dropwise thereto for 60 minutes. After the dropwise addition, the flask is kept at 75° C. for 3 hours and then returned to room temperature.

As a result, a composite resin particle dispersion (M50) containing composite resin particles is obtained. The resin particles in M50 have a volume average particle diameter (D50v) of 223 nm and a weight average molecular weight of 220,000 measured by GPC (UV detection), and the solid content of M50 is 32%.

The composite resin particle dispersion (M50) is dried so that the composite resin particles are collected. By using a differential scanning calorimeter (DSC-60A, manufactured by Shimadzu Corporation), the thermal behavior of the styrene-based resin particles at a temperature in a range of −150° C. to 100° C. is analyzed. As a result, two glass transition temperatures are observed. Table 7 shows the glass transition temperatures.

Preparation of Pressure-Responsive Particles

Preparation of Pressure-Responsive Particles (50) to (55)

Pressure-responsive particles (50) to (55) are prepared in the same manner as in Preparation of pressure-responsive particles (1), except that the materials are changed according to the specifications shown in Table 8.

The pressure-responsive particles (50) to (55) are sampled, and the thermal behavior of the samples at a temperature in a range of −150° C. to 100° C. is analyzed using a differential scanning calorimeter (DSC-60A, manufactured by Shimadzu Corporation). As a result, two glass transition temperatures are observed. Table 8 shows the glass transition temperatures.

For the pressure-responsive particles (50) to (55), the temperature T1 and the temperature T2 are determined by the measurement method described above. As a result, it has been revealed that all the pressure-responsive particles (50) to (55) satisfy Formula 1 "10° C.≤T1−T2".

The cross section of the pressure-responsive particles (50) to (55) is observed with a scanning electron microscope (SEM). As a result, a sea-island structure is observed. The pressure-responsive particles (50) to (55) have a core portion in which island phases are present and a shell layer in which no island phase is present. The sea phase contains a styrene-based resin, and the island phases contain a (meth)acrylic acid ester-based resin. By the measurement method described above, the average diameter of the island phases is determined. Table 8 shows the average diameter of the island phases.

In the pressure-responsive particles (50) to (55), the liberation rate of the inorganic oxide particles is in a range of 10% by mass or higher and 40% by mass or lower.

Evaluation of Pressure-Responsive Phase Transition

The respective pressure-responsive particles are sampled, the temperature T1 and the temperature T3 of the samples are measured with a flow tester (CFT-500 manufactured by Shimadzu Corporation), and the temperature difference (T1−T3) is calculated. Table 8 show the temperature difference (T1−T3).

Evaluation of Adhesiveness

Just as the pressure-responsive particles (1) and the like, the particles are evaluated in terms of adhesiveness by the evaluation method in Evaluation of adhesiveness described above. The results are shown in Table 8.

Toluene: 14 parts
Polymethyl methacrylate: 2 parts
Carbon black (VXC72: manufactured by Cabot Corporation): 0.12 parts The above materials excluding ferrite particles are mixed with glass beads (diameter: 1 mm, in the same amount as toluene), and the mixture is agitated with a sand mill manufactured by Kansai Paint Co., Ltd. at a rotation frequency of 1,200 rpm for 30 minutes, thereby obtaining a dispersion. The dispersion and the ferrite particles are put in a vacuum deaerating kneader and dried under reduced pressure with agitation, thereby obtaining a resin-coated carrier (1).

As an apparatus for manufacturing a printed matter, the apparatus having the form shown in FIG. 4 is prepared. That

TABLE 8

| | Core portion | | | | | |
|---|---|---|---|---|---|---|
| Pressure-responsive particles | Composite resin particle dispersion | Polymerization component of St-based resin (1) | Polymerization component of Ac-based resin | Polymerization component of St-based resin (2) | Mass ratio between St-based resin and Ac-based resin (St:Ac) | Shell layer St-based resin particle dispersion |
| 50 | M50 | St/BA/AA= 78/20/2 | 2EHA/BA = 50/50 | St/BA = 85/15 | 60:40 | St1 |
| 51 | M51 | St/ BA/AA = 78/20/2 | 2EHA/BA = 50/50 | St/BA = 90/10 | 60:40 | St1 |
| 52 | M52 | St/ BA/AA = 78/20/2 | 2EHA/BA = 70/30 | St/BA = 70/30 | 60:40 | St1 |
| 53 | M53 | St/ BA/AA = 78/20/2 | 2EHA/BA = 30/70 | St/BA = 90/10 | 60:40 | St1 |
| 54 | M54 | St/BA/AA= 78/20/2 | 2EHA/BA = 60/40 | St/BA = 85/15 | 50:50 | St1 |
| 55 | M55 | St/BA/AA = 83/15/2 | 2EHA/BA = 60/40 | St/BA = 85/15 | 50:50 | St1 |

| | Pressure-responsive particles | | | | | | | |
|---|---|---|---|---|---|---|---|---|
| Pressure-responsive particles | D50v µm | Average diameter of island phase nm | Tg °C. | Tg °C. | Tg difference °C. | T3 °C. | Pressure-responsive phase transition (T1 − T3) °C. | Adhesiveness | Note |
| 50 | 8.0 | 250 | −52 | 55 | 107 | 75 | 10 | A | Example |
| 51 | 8.0 | 250 | −52 | 55 | 107 | 75 | 10 | A | Example |
| 52 | 8.0 | 250 | −54 | 53 | 107 | 74 | 13 | A | Example |
| 53 | 8.0 | 250 | −52 | 54 | 106 | 73 | 13 | A | Example |
| 54 | 8.0 | 270 | −52 | 54 | 106 | 78 | 15 | A | Example |
| 55 | 8.0 | 270 | −52 | 65 | 117 | 74 | 15 | A | Example |

The postcards prepared using the pressure-responsive particles (50) to (55) are evaluated in the same manner as in Evaluation of image loss described later. As a result, the pressure-responsive particles (50) to (55) are classified as A.

Manufacturing Printed Matter by Electrophotographic Method

Any of the pressure-responsive particles (1) to (31), (c1) to (c3), and (50) to (55) (10 parts) and 100 parts of the following resin-coated carrier (1) are put in a V-blender, agitated for 20 minutes, and then sieved with a vibrating sieve having an opening size of 212 µm, thereby obtaining developers (1) to (31), (c1) to (c3), and (50) to (55).

Resin-Coated Carrier (1)
  Mn—Mg—Sr-based ferrite particles (average particle diameter: 40 µm): 100 parts is, an apparatus for manufacturing a printed matter is prepared which includes an intermediate transfer-type printing unit consisting of five units arranged in tandem and a crimping unit having a folding device and a pressing device, in which the printing unit performs both the operation of arranging the pressure-responsive particles according to the present exemplary embodiment on a recording medium and operation of forming a color image.

The developer according to the present exemplary embodiment (or a developer for comparison), a yellow developer, a magenta developer, a cyan developer, and a black developer are put in the five developing machines included in the printing unit. As the color developers such as the yellow developer, commercially available products manufactured by Fuji Xerox Co., Ltd. are used.

As a recording medium, postcard paper V424 manufactured by Fuji Xerox Co., Ltd. is prepared.

An image having an area density of 30% that is a mixture of black texts and a full color photographic image is formed on one surface of the postcard paper.

The amount of the pressure-responsive particles according to the present exemplary embodiment (or pressure-responsive particles for comparison) applied to the image forming area within the image forming surface of the postcard paper is 3 g/m$^2$.

The folding device is a device that folds the postcard paper in half so that the image forming surface becomes the inner side.

The pressure applied by the pressing device is 90 MPa.

By using the apparatuses described above, 10 postcards are continuously prepared under the conditions described above. Each of the postcards is folded in half so that the image forming surface becomes the inner side, and the image forming surfaces are caused to adhere to each other.

The tenth postcard is cut along the length direction, thereby preparing rectangular test pieces having a width of 15 mm. The 90 degree peel test is performed on the test pieces. The peeling rate for the 90 degree peel test is set to 20 mm/min. While the test piece is being peeled 50 mm from 10 mm after the start of measurement, a load (N) is measured at an interval of 0.4 mm, and the average thereof is calculated. Furthermore, the average of loads (N) for three test pieces is calculated. The load (N) required for peeling is classified as follows. The results are shown in Tables 9, 10, and 11.

A: 0.8N or higher
B: 0.6N or higher and lower than 0.8N
C: 0.4N or higher and lower than 0.6N
D: 0.2N or higher and lower than 0.4N
E: Lower than 0.2N

TABLE 9

| Developer | Pressure-responsive particles | Adhesiveness | Note |
|---|---|---|---|
| c1 | c1 | D | Comparative Example |
| c2 | c2 | D | Comparative Example |
| c3 | c3 | D | Comparative Example |
| 1 | 1 | A | Example |
| 2 | 2 | A | Example |
| 3 | 3 | A | Example |
| 4 | 4 | A | Example |
| 5 | 5 | A | Example |
| 6 | 6 | A | Example |
| 7 | 7 | A | Example |
| 8 | 8 | A | Example |
| 9 | 9 | A | Example |
| 10 | 10 | A | Example |
| 11 | 11 | A | Example |
| 12 | 12 | A | Example |
| 13 | 13 | A | Example |
| 14 | 14 | B | Example |
| 15 | 15 | B | Example |
| 16 | 16 | B | Example |
| 17 | 17 | A | Example |
| 18 | 18 | A | Example |
| 19 | 19 | A | Example |
| 20 | 20 | A | Example |
| 21 | 21 | B | Example |
| 22 | 22 | C | Example |
| 23 | 23 | B | Example |
| 24 | 24 | A | Example |
| 25 | 25 | A | Example |

TABLE 9-continued

| Developer | Pressure-responsive particles | Adhesiveness | Note |
|---|---|---|---|
| 26 | 26 | A | Example |
| 27 | 27 | A | Example |

TABLE 10

| Developer | Pressure-responsive particles | Adhesiveness | Note |
|---|---|---|---|
| 28 | 28 | A | Example |
| 29 | 29 | A | Example |
| 30 | 30 | B | Example |
| 31 | 31 | B | Example |

TABLE 11

| Developer | Pressure-responsive particles | Adhesiveness | Note |
|---|---|---|---|
| 50 | 50 | A | Example |
| 51 | 51 | A | Example |
| 52 | 52 | A | Example |
| 53 | 53 | A | Example |
| 54 | 54 | A | Example |
| 55 | 55 | A | Example |

The postcards prepared using the developers (1) to (31) and (50) to (55) are evaluated in the same manner as in Evaluation of image loss described later. As a result, the developers (1) to (31) and (50) to (55) are classified as A.

Examination on Liberation Rate of Inorganic Oxide Particles

Preparation of Pressure-Responsive Particles (60) to (65), (c4), and (c5)

The pressure-responsive base particles (60) having a number average particle diameter of 8.5 μm are prepared in the same manner as in Preparation of pressure-responsive base particles (1), except that the time required for the fusion/coalescence step is adjusted.

First silica particles and second silica particles are mixed with 100 parts of the pressure-responsive base particles (60) according to "Amount added to exterior" shown in Table 12, and these particles are mixed together for 30 seconds at a rotation frequency of 13,000 rpm by using a sample mill. The obtained particles are sieved with a vibrating sieve having an opening size of 45 μm, thereby obtaining pressure-responsive particles (60) to (65), (c4), and (c5).

First silica particles (small-sized silica particles): hydrophobized silica particles granulated by wet method, having undergone surface treatment with 1,1,1,3,3,3-hexamethyldisilazane, and having a number average particle diameter of 94 nm.

Second silica particles (large-sized silica particles): hydrophobized silica particles granulated by wet method, having undergone surface treatment with 1,1,1,3,3,3-hexamethyldisilazane, and having a number average particle diameter of 148 nm.

The pressure-responsive particles (60) are sampled, and the thermal behavior of the samples at a temperature in a range of −150° C. to 100° C. is analyzed using a differential scanning calorimeter (DSC-60A, manufactured by Shimadzu Corporation). As a result, two glass transition temperatures are observed. The glass transition temperatures are −52° C. and 54° C.

For the pressure-responsive particles (60) to (65), the temperature T1 and the temperature T2 are determined by the measurement method described above. As a result, it has been revealed that all the pressure-responsive particles (60) to (65) satisfy Formula 1 "10° C.≤T1−T2".

Evaluation of Adhesiveness

As a recording medium, postcard paper V424 manufactured by Fuji Xerox Co., Ltd. is prepared. By using an image forming apparatus DocuCentre C7550I manufactured by Fuji Xerox Co., Ltd. and commercially available yellow toner, magenta toner, cyan toner, and black toner manufactured by Fuji Xerox Co., Ltd., an image having an area density of 30% that is a mixture of black texts and a full color photographic image is formed on and fixed to one surface of the postcard paper.

The pressure-responsive particles are scattered on the entire image forming surface of the postcard paper so that the amount of the particles applied equals 3 g/m². The postcard paper is passed through a belt roll-type fixing machine so that the pressure-responsive particles are fixed to the image forming surface of the postcard paper and that a layer of the pressure-responsive particles is formed.

By using a sealer PRESSLE multiII manufactured by TOPPAN FORMS CO., LTD., the postcard paper having the layer of pressure-responsive particles on the image forming surface is folded in half so that the image forming surface becomes the inner side. Pressure is applied to the postcard paper folded in half, so that the image forming surfaces of the inner side adhere to each other at a pressure of 90 MPa.

By using the apparatuses described above, 10 postcards are continuously prepared under the conditions described above. Each of the postcards is folded in half so that the image forming surface becomes the inner side, and the image forming surfaces are caused to adhere to each other.

The tenth postcard is cut along the length direction, thereby preparing rectangular test pieces having a width of 15 mm. The 90 degree peel test is performed on the test pieces. The peeling rate for the 90 degree peel test is set to 20 mm/min. While the test piece is being peeled 50 mm from 10 mm after the start of measurement, a load (N) is measured at an interval of 0.4 mm, and the average thereof is calculated. Furthermore, the average of loads (N) for three test pieces is calculated. The load (N) required for peeling is classified as follows. The results are shown in Table 12.

A: 0.8N or higher
B: 0.6N or higher and lower than 0.8N
C: 0.4N or higher and lower than 0.6N
D: 0.2N or higher and lower than 0.4N
E: Lower than 0.2N Evaluation of Image Loss By the same method as described above, 100 postcards are continuously prepared under the conditions described above. Each of the postcards is folded in half so that the image forming surface becomes the inner side, and the image forming surfaces are caused to adhere to each other. Then, the adhesive surface of the postcard is peeled off, and the image on the adhesive surface is visually observed and classified as follows. The results are shown in Table 12.

A: No image loss is observed in all of the 100 postcards.
B: Image loss is observed in 1 to 5 postcards out of 100 postcards.
C: Image loss is observed in 6 to 15 postcards out of 100 postcards.
D: Image loss is observed in 16 to 30 postcards out of 100 postcards.
E: Image loss is observed in all of the 100 postcards.

| | | Inorganic oxide particles | | | | | | | | |
|---|---|---|---|---|---|---|---|---|---|---|
| | Base particles Number average particle | First silica particles (small-sized silica particles) Amount added to | Second silica particles (large-sized silica particles) Amount added | Total amount added to | Number average particle diameter Db of | Ratio of particle diameter | Liberation rate | Performance evaluation | | |
| Pressure-responsive particles | diameter Da μm | exterior Part by mass | to exterior Part by mass | exterior Part by mass | all silica particles nm | Db/Da — | % by mass | Adhesiveness — | Image loss — | Note |
| c4 | 8.5 | 1.0 | 0.2 | 1.2 | 102 | 0.012 | 5 | A | E | Comparative Example |
| 60 | 8.5 | 1.0 | 1.0 | 2.0 | 115 | 0.014 | 10 | A | D | Example |
| 61 | 8.5 | 1.5 | 1.5 | 3.0 | 118 | 0.014 | 15 | A | C | Example |
| 62 | 8.5 | 1.8 | 2.0 | 3.8 | 122 | 0.014 | 20 | A | B | Example |
| 63 | 8.5 | 2.0 | 2.5 | 4.5 | 131 | 0.015 | 30 | A | A | Example |
| 64 | 8.5 | 2.0 | 2.8 | 4.8 | 139 | 0.016 | 35 | A | A | Example |
| 65 | 8.5 | 2.0 | 3.0 | 5.0 | 144 | 0.017 | 40 | B | A | Example |
| c5 | 8.5 | 3.0 | 3.0 | 6.0 | 114 | 0.013 | 50 | C | A | Comparative Example |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. Pressure-responsive particles comprising:
   pressure-responsive base particles; and
   inorganic oxide particles comprising small-sized silica particles having a particle diameter of 100 nm or less and large-sized silica particles having a particle diameter of greater than 100 nm, wherein an amount of the inorganic oxide particles added to the exterior of the pressure-responsive base particles is 2 parts by mass or more and 5 parts by mass or less with respect to 100 parts by mass of the pressure-responsive base particles,
   wherein the pressure-responsive base particles contain a styrene-based resin which contains styrene and other vinyl monomers as polymerization components and a (meth)acrylic acid ester-based resin which contains at least two kinds of (meth)acrylic acid esters as polymerization components and in which a mass ratio of the (meth)acrylic acid esters to all polymerization components is 90% by mass or higher,
   a liberation rate of the inorganic oxide particles is 10% by mass or higher and 40% by mass or lower,
   the pressure-responsive particles have at least two glass transition temperatures, and
   a difference between a lowest glass transition temperature and a highest glass transition temperature is 30° C. or higher.

2. The pressure-responsive particles according to claim 1, wherein the liberation rate of the inorganic oxide particles is 15% by mass or higher and 35% by mass or lower.

3. The pressure-responsive particles according to claim 1, wherein db/Da which is a ratio of a number average particle diameter db of the inorganic oxide particles to a number average particle diameter Da of the pressure-responsive base particles is 0.002 or higher and 0.020 or lower.

4. The pressure-responsive particles according to claim 3, wherein the ratio db/Da is 0.005 or higher and 0.015 or lower.

5. The pressure-responsive particles according to claim 1, wherein a mass ratio of styrene to all polymerization components of the styrene-based resin is 60% by mass or higher and 95% by mass or lower.

6. The pressure-responsive particles according to claim 1, wherein among the at least two kinds of (meth)acrylic acid esters contained in the (meth)acrylic acid ester-based resin as polymerization components, a mass ratio between two kinds of (meth)acrylic acid esters having a highest mass proportion is 80:20 to 20:80.

7. The pressure-responsive particles according to claim 1, wherein among the at least two kinds of (meth)acrylic acid esters contained in the (meth)acrylic acid ester-based resin as polymerization components, (meth)acrylic acid alkyl esters are two kinds of (meth)acrylic acid esters having a highest mass proportion, and
   a difference in the number of carbon atoms between alkyl groups of the two kinds of (meth)acrylic acid alkyl esters is 1 or greater and 4 or less.

8. The pressure-responsive particles according to claim 1, wherein the other vinyl monomers that the styrene-based resin contains as polymerization components include a (meth)acrylic acid ester.

9. The pressure-responsive particles according to claim 1, wherein the other vinyl monomers that the styrene-based resin contains as polymerization components include at least one of n-butyl acrylate or 2-ethylhexyl acrylate.

10. The pressure-responsive particles according to claim 1, wherein the other vinyl monomers of the styrene-based resin comprise a (meth)acrylic acid ester that is the same as one of the at least two kinds of (meth)acrylic acid esters used in the (meth)acrylic acid ester-based resin as the polymerization components.

11. The pressure-responsive particles according to claim 1, wherein the (meth)acrylic acid ester-based resin contains 2-ethylhexyl acrylate and n-butyl acrylate as polymerization components.

12. The pressure-responsive particles according to claim 1, wherein in the pressure-responsive base particles, a content of the styrene-based resin is higher than a content of the (meth)acrylic acid ester-based resin.

13. The pressure-responsive particles according to claim 1, wherein the pressure-responsive base particles have a sea phase containing the styrene-based resin and island phases which are dispersed in the sea phase and contain the (meth)acrylic acid ester-based resin.

14. The pressure-responsive particles according to claim 13, wherein an average diameter of the island phases is 200 nm or greater and 500 nm or less.

15. The pressure-responsive particles according to claim 1, wherein the pressure-responsive base particles have a core portion that contains the styrene-based resin and the (meth)acrylic acid ester-based resin and a shell layer that coats the core portion.

16. The pressure-responsive particles according to claim 15, wherein the shell layer contains the styrene-based resin.

17. The pressure-responsive particles according to claim 1, which have a viscosity of 10,000 Pa·s under a pressure of 4 MPa at a temperature of 90° C. or lower.

18. A cartridge that accommodates the pressure-responsive particles according to claim 1 and is attached to and detached from an apparatus for manufacturing a printed matter.

19. An apparatus for manufacturing a printed matter, comprising:
   an arrangement unit that accommodates the pressure-responsive particles according to claim 1 and arranges the pressure-responsive particles on a recording medium; and
   a crimping unit that folds and crimps the recording medium or stacks and crimps the recording medium and another recording medium together.

20. The apparatus for manufacturing a printed matter according to claim 19, further comprising:
   a color image forming unit that forms a color image on the recording medium by using a coloring material.

21. A method for manufacturing a printed matter, comprising:
   arranging the pressure-responsive particles according to claim 1 on a recording medium; and
   folding and crimping the recording medium or stacking and crimping the recording medium and another recording medium together.

22. The method for manufacturing a printed matter according to claim 21, further comprising:
   forming a color image on the recording medium by using a coloring material.

23. A printed matter wherein facing surfaces of a folded recording medium adhere to each other by the pressure-responsive particles according to claim 1.

24. A printed matter wherein facing surfaces of a plurality of stacked recording media adhere to each other by the pressure-responsive particles according to claim 1.

25. A sheet for manufacturing a printed matter, comprising:
- a substrate; and
- pressure-responsive particles arranged on the substrate, wherein the pressure-responsive particles according to claim 1 are used as the pressure-responsive particles.

26. A method for manufacturing a sheet for manufacturing a printed matter, comprising:
- arranging the pressure-responsive particles according to claim 1 on a substrate.

* * * * *